US010108924B2

(12) United States Patent
Wane

(10) Patent No.: US 10,108,924 B2
(45) Date of Patent: Oct. 23, 2018

(54) METHODS AND APPARATUS TO EMULATE A TOY

(71) Applicant: AT&T Mobility II LLC, Atlanta, GA (US)

(72) Inventor: Ismaila Wane, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 570 days.

(21) Appl. No.: 14/275,662

(22) Filed: May 12, 2014

(65) Prior Publication Data

US 2015/0087427 A1 Mar. 26, 2015

Related U.S. Application Data

(60) Provisional application No. 61/882,626, filed on Sep. 26, 2013.

(51) Int. Cl.
| A63F 13/213 | (2014.01) |
| G06Q 10/08 | (2012.01) |
| G06Q 50/00 | (2012.01) |
| G06Q 50/12 | (2012.01) |
| A63F 13/71 | (2014.01) |
| A63F 13/323 | (2014.01) |

(52) U.S. Cl.
CPC ......... *G06Q 10/087* (2013.01); *A63F 13/213* (2014.09); *A63F 13/323* (2014.09); *A63F 13/71* (2014.09); *G06Q 50/01* (2013.01); *G06Q 50/12* (2013.01)

(58) Field of Classification Search
CPC ..................................................... A63F 13/12
See application file for complete search history.

(56) References Cited

U.S. PATENT DOCUMENTS 6,397,080 B1 * 5/2002 Viktorsson .............. G06T 15/00
455/558
6,468,162 B1 10/2002 Nakamura
(Continued)

FOREIGN PATENT DOCUMENTS

| WO | 9964976 | 12/1999 |
| WO | 2009112835 | 9/2009 |
| WO | 2009141751 | 11/2009 |

OTHER PUBLICATIONS

"Can an Android NFC phone act as an NFC tag?" <http://stackoverflow.com/questions/6138077/can-an-android-nfc-phone-act-as-an-nfc-tag>, retrieved on Feb. 7, 2014 (4 pages).
(Continued)

*Primary Examiner* — Tramar Harper
*Assistant Examiner* — Jeffrey Wong
(74) *Attorney, Agent, or Firm* — Hanley, Flight & Zimmerman, LLC

(57) ABSTRACT

Methods, apparatus, systems and articles of manufacture to emulate a toy are disclosed. An example method includes identifying a toy to be emulated by a mobile communication device. A request to obtain toy-identifying data associated with the toy is transmitted to a remote storage. The toy-identifying data is received from the remote storage at the mobile communication device. The toy-identifying data is stored in a secure element of the mobile communication device. The toy-identifying data is transmitted, through a wireless radio of the mobile communication device, to a gaming console.

20 Claims, 22 Drawing Sheets

(56) References Cited

U.S. PATENT DOCUMENTS

| | | |
|---|---|---|
| 6,761,637 B2 | 7/2004 | Weston et al. |
| 6,773,325 B1 | 8/2004 | Mawle et al. |
| 7,081,033 B1 | 7/2006 | Mawle et al. |
| 7,115,034 B2 | 10/2006 | Kuwahara |
| 7,677,948 B2 | 3/2010 | Ganz |
| 8,025,573 B2 | 9/2011 | Stenton et al. |
| 8,186,599 B2 | 5/2012 | Fleischer et al. |
| 8,414,349 B2 | 4/2013 | Boman et al. |
| 8,568,192 B2 | 10/2013 | Raichman et al. |
| 8,641,471 B2 | 2/2014 | Ganz |
| 8,647,205 B2 | 2/2014 | Tanaka et al. |
| 8,661,354 B2 | 2/2014 | Sarmenta |
| 2003/0064812 A1 | 4/2003 | Rappaport et al. |
| 2006/0003805 A1 | 1/2006 | Richardson et al. |
| 2006/0054679 A1 | 3/2006 | Ruping |
| 2011/0244964 A1 | 10/2011 | Glynne-Jones et al. |
| 2012/0077593 A1 | 3/2012 | Sarmenta |
| 2012/0130839 A1* | 5/2012 | Koh .................. G06Q 20/352 705/26.1 |
| 2012/0190452 A1 | 7/2012 | Weston et al. |
| 2013/0196766 A1 | 8/2013 | Leyland et al. |
| 2013/0231191 A1 | 9/2013 | Rodriguez Machado et al. |
| 2013/0252726 A1* | 9/2013 | Roberts ................ A63F 13/69 463/29 |
| 2014/0031127 A1 | 1/2014 | Westerberg |
| 2014/0051329 A1 | 2/2014 | Raichman et al. |
| 2014/0121008 A1* | 5/2014 | Canessa ................ A63F 13/02 463/29 |

OTHER PUBLICATIONS

Russell Holly, "Activision delivers cease and desist to Skylanders tinkerer", <http://www.geek.corn/games/activision-delivers-cease-and-desist-to-skylanders-tinkerer>, Dec. 28, 2011 (5 pages).

Disney Infinity Fans, "RFID UID numbers", <http://www.disneyinfinityfans.com/viewtopic.php?t=3897&p=39733#sthash.IGFroyW7.dpbs>, retrieved on Feb. 7, 2014 (7 pages).

CBS Interactive Inc., "Can you read disc with a NFC enabled device?" <http://www.gamefaqs.com/boards/695533-disney-infinity/67083840>, retrieved on Feb. 7, 2014 (5 pages).

XDA Developers, "NFC spoofing for a *certain* Portal using game" retrieved on Feb. 11, 2014 (2 pages).

"/diy/—Do It Yourself" <https://archive.installgentoo.net/diy/thread/152683>, retrieved on Feb. 11, 2014 (4 pages).

* cited by examiner

METHODS AND APPARATUS TO EMULATE A TOY

RELATED APPLICATIONS

This patent claims priority from U.S. Provisional Patent Application Ser. No. 61/882,626 which is entitled "ELECTRONIC TOY BOX PLATFORM" and was filed on Sep. 26, 2013. U.S. Provisional Patent Application Ser. No. 61/882,626 is hereby incorporated by reference in its entirety.

FIELD OF THE DISCLOSURE

This disclosure relates generally to virtual toy emulation, and, more particularly, to methods and apparatus to emulate a toy.

BACKGROUND

Toys have evolved other the years. Some video games enable consumers to play with a physical toy in a virtual video game world. Physical toys include a tag which, when scanned by a reader, enables the video game to identify the toy. The tag used in the physical toy is typically a near field communication (NFC) tag that includes toy-identifying data/information. NFC is a short-range communication protocol. NFC is used in many applications including, for example, credit cards, posters, point of sale terminals, universal serial bus (USB) tokens, memory cards, and/or other objects.

Many mobile devices are now being produced with NFC scanning capability. Such scanning capability enables a user of the mobile device to, for example, scan a physical object (e.g., an NFC enabled movie poster) and retrieve information about the object (e.g., show times for nearby theaters playing the movie depicted on the movie poster). Some NFC radios include an emulation mode that enables emulation of a physical object such as a credit card, transit card, badge, etc. In such an NFC emulation mode, the radio appears to an NFC reader as if it is the physical object being emulated (e.g., a reader will interpret the mobile device as a credit card, transit card, badge, etc.)

A key concern of implementing an emulation system is security. Usage of an NFC radio is protected from applications executing on the mobile device by a secure element. The secure element in some known systems is a secure processor and memory environment where application code and application data can be securely stored, executed, and/or administered. In known systems, the secure element is implemented using a smart card chip.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
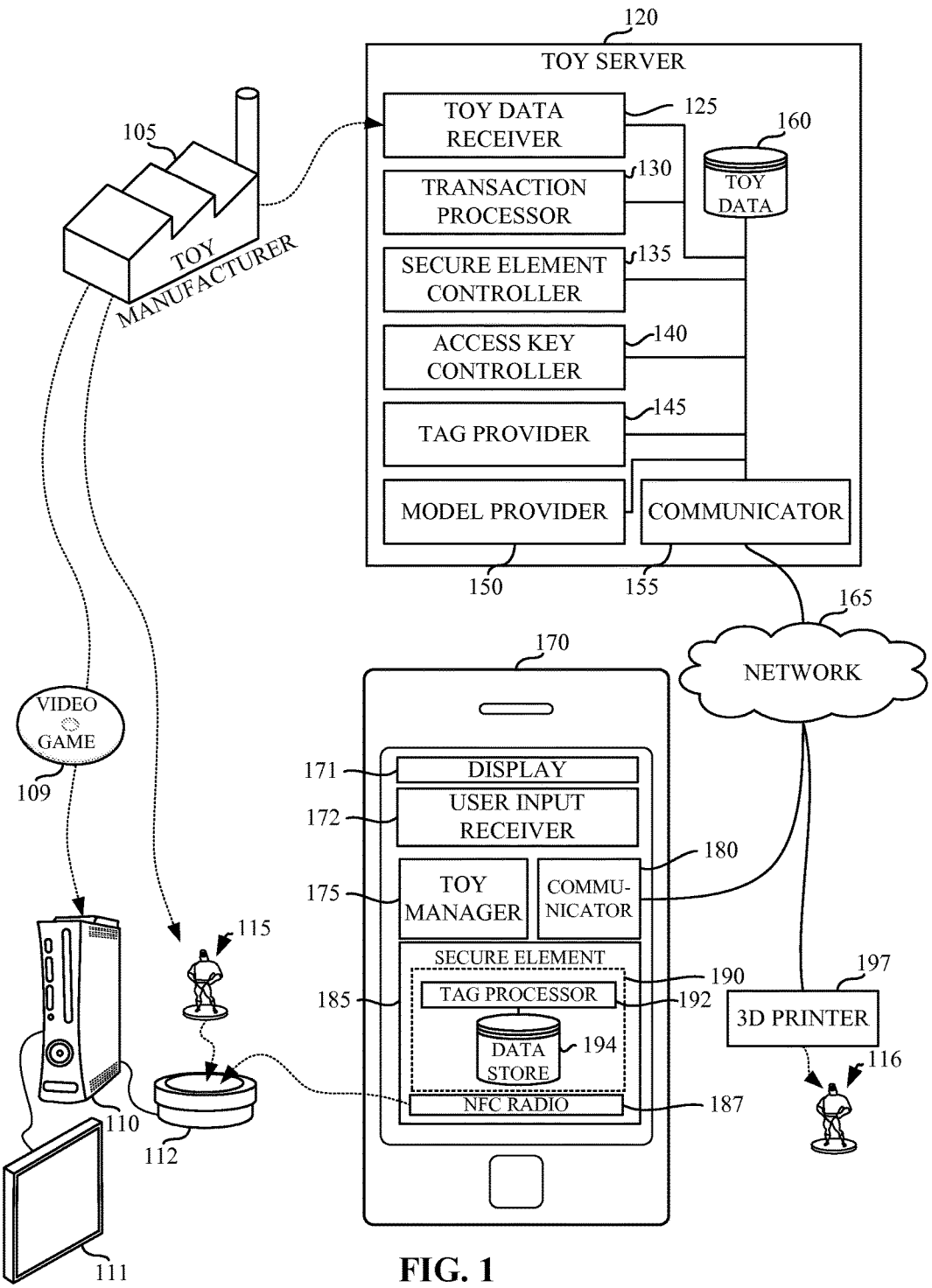
FIG. 1 is a block diagram of an example environment of use to emulate a toy.

In examples disclosed herein, NFC emulation is used to emulate a tag associated with a toy to be used in a video game. In examples disclosed herein, the emulation system is protected by a secure element (e.g., a secure storage) implemented using a Universal Integrated Circuit Card, such as a Subscriber Identity Module (SIM) card. In some examples the secure element is implemented by a separate secure smart card chip, or in an SD card that can be inserted in the mobile communication device. In some examples, the secure element is implemented using a software-based secure element using, for example, a Host Card Emulation (HCE) mode, a virtual secure element, etc.

In examples disclosed herein, a mobile network operator (e.g., a cell phone carrier) manages data (e.g., keys and/or instructions) stored in the secure element using over the air (OTA) communication protocols. In examples disclosed herein, tag data is transmitted and/or stored in an encrypted format. As such, mobile network operators can securely transmit tag data to the secure element without such data being intercepted in an unencrypted format. Once the tag data is stored in the secure element, the tags may be accessed for emulation by a toy manager executing on the mobile communication device. As disclosed herein, tag data includes toy-identifying data. In some examples, the tag data additionally or alternatively includes information that is not used to identify the toy. Such non-toy-identifying data may be used to, for example, identify a format of the tag data, game information, identify a communication protocol to be used when transmitting or receiving tag data, etc.

In some examples, applications executing on the mobile device are limited in the types of functions that can be performed when interacting with the secure element. For example, example toy managers disclosed herein enable a tag for emulation, disable a tag from being emulated, scan a tag of a physical toy, read encrypted tag data, etc. In examples disclosed herein, the example toy manager is not capable of accessing the tag data stored in the secure element in an unencrypted format.

In examples disclosed herein, the example toy manager provides an interface to enable users to select a toy for emulation. The user then places the mobile communication device on the NFC reader connected to the video game console, and plays the video game as if they had placed the physical toy emulated by the mobile communication device on the NFC reader. Such emulation enables the user to virtually transport their toys to play at different locations without transporting the actual physical toys. As a result, when traveling to, for example, a friend's house, the user does not need to carry a large bag of toys (or be forced to select only a few toys to bring with), but may instead load all of their toys into their mobile communication device for easy transport.

Moreover, in examples disclosed herein, the toy manager enables easier acquisition of toys. Rather than travel to a brick-and-mortar store to purchase a toy or order a physical toy for delivery, the toy manager enables a user to electronically purchase a toy and instantaneously emulate the purchased toy using their mobile communication device. In some examples, the virtual toy is immediately available for emulation and the physical toy arrives later after being transported through a delivery or mail system. In other examples, the physical toy is not physically delivered by instead is electronically sent to a 3D printer for printing at the purchaser's location.

FIG. 1 is a block diagram of an example environment of use in which a toy may be emulated. The example environment of FIG. 1 includes a toy manufacturer 105, a gaming console 110, a tag reader 112, a physical toy 115, a toy server 120, a network 165, a mobile communication device 170, a 3D printer 197, and a 3D-printed physical toy 116.

The example toy manufacturer 105 of FIG. 1 may be an entity that provides a gaming platform to consumers. In the illustrated example, the gaming platform includes a video game and toys for use with the video game. In the illustrated example, the toy manufacturer 105 creates the video game for execution by the gaming console 110. However, in some examples, the toy manufacturer 105 does not provide the gaming platform and/or does not provide the video game. In some such examples, the toy manufacturer 105 utilizes a third party service for developing the video game. The example toy manufacturer 105 of FIG. 1 communicates with the toy server 120 to upload models of the physical toys and tag data that are used when creating the physical toys. The upload of these models and data enables the toy server 120 and the mobile communication device 170 to emulate the physical toy 115.

The example gaming console 110 of the illustrated example of FIG. 1 is a Microsoft Xbox™. However, any other gaming console may additionally or alternatively be used such as, for example, a Sony PlayStation™, a Nintendo Wii™, a personal computer, etc. In the illustrated example, the toy manufacturer 105 does not produce the gaming console 110, but instead creates a video game to be executed by the gaming console 110. However, in some examples, the toy manufacturer 105 also manufacturers create the gaming console 110. The gaming console 110 of the illustrated example of FIG. 1 is connected to a tag reader 112 to read a tag of the physical toy 115 when the physical toy 115 is placed within proximity of the tag reader 112. When executing the video game, the example game console 110 interfaces with the example tag reader 112 to read a tag embedded in the example physical toy 115. Based on the identity of the physical toy 115, the example game console 110 displays a virtual representation (e.g., an avatar) of the detected toy in the video game.

In the illustrated example of FIG. 1, the gaming console 110 is connected to an external display 111 (e.g., a television, a computer monitor, etc.) to enable a user to interact with the video game. However, in some examples, the gaming console 110 may include the display 111. For example, the gaming console 110 may be a handheld gaming device such as, for example, a Nintendo 3DS™, a Sony PlayStation Vita™, etc.

The example tag reader 112 of the illustrated example of FIG. 1 is implemented by an NFC reader. However, any other type of reader may additionally or alternatively be used such as, for example, a barcode scanner, a quick response (QR) code reader, a radio frequency identification (RFID) reader, etc.

In the illustrated example, the tag reader 112 has a tag reading range of twelve inches or less. That is, the physical toy 115 must be placed within twelve inches of the reader 112 to be read. In some examples, the tag reader 112 may have a different tag reading range. For example, some example tag readers may read tags within three inches, two feet, etc. Using a small tag reading range enables a select number of physical toys to be placed in proximity of the reader, thereby controlling the toys that are displayed in the video game. In the illustrated example, the tag reader 112 reads one tag at a time. However, in some examples, the tag reader may read multiple tags at once. In the illustrated example, a single tag reader 112 is connected to the gaming console 110. However, in some examples, multiple tag readers 112 may be connected to the gaming console 110 to enable multiple tags to be read at a single time. In some examples, the tag reader 112 has writing capabilities to write data to the tag.

In some examples, the example gaming console 110 does not come packaged with the tag reader 112. In some such examples, the example toy manufacturer 105 produces the tag reader 112 which, in some examples, is sold with the video game. In other examples, the tag reader 112 is packaged with the gaming console 110 at the point of sale and/or the toy reader is manufactured and/or sold by the game console and/or a third party.

The example physical toy 115 of the illustrated example of FIG. 1 is a toy for use with the tag reader 112. The example physical toy 115 includes tag circuitry which, when read by the tag reader, provides toy-identifying data. In the illustrated example, the toy-identifying data is encrypted data that is decrypted by the video game. However, in some examples, the toy-identifying data may not be encrypted. In the illustrated example, the tag circuitry enables data to be written to the tag as, for example, updated toy-identifying data. For example, while playing the video game the toy may "level up," and/or gain access to other game features. When data is written to the tag circuitry, that data persists with the toy. As such, when a toy is used on a first gaming console, but later moved to a second gaming console (e.g., a gaming console at a friend's house) the data written to the tag informs the second console of features specific to that toy (e.g., a level of the toy, in-game features that have been unlocked, etc.).

The example toy server 120 of the illustrated example of FIG. 1 includes an example toy data receiver 125, an example transaction processor 130, an example secure element controller 135, an example access key controller 140, an example tag provider 145, an example model provider 150, an example communicator 155, and an example toy data database 160. The example toy server 120 of the illustrated example of FIG. 1 is operated by a mobile network operator (e.g., a cell phone carrier). However, any other entity may operate the toy server such as, for example, a toy company, a third party service, an internet service provider, etc.

The example toy data receiver 125 of the illustrated example of FIG. 1 receives toy data from the toy manufacturer 105. To enable toy emulation, toy data associated with each toy to be emulated is received from the toy manufacturer 105 via the toy data receiver 125. This toy data includes, for example, the toy-identifying data to be used for a particular toy, an encryption key to be used to encrypt and/or decrypt the tag data, a model of a toy to be used and/or otherwise displayed in toy interface(s), sales instructions to be used when selling the toy in a virtual toy store, etc. In the illustrated example, the example toy data receiver 125 receives the toy data via hypertext transfer protocol (HTTP) interface such as, for example, a website. However, any other way of receiving data may additionally or alternatively be used such as, for example, a HTTP Secure (HTTPS) protocol, a file transfer protocol (FTP) site, local media (e.g., a universal serial bus (USB) device), etc.

The example transaction processor 130 of the illustrated example of FIG. 1 processes transactions at the request of a user to purchase a virtual toy. In the illustrated example, the example transaction processor 130 receives a request for purchasing a toy from the mobile communication device 170. The example transaction processor 130 communicates with, for example, a credit card processor to receive funds to consummate the toy purchase. Once the purchase is confirmed, the transaction processor 130 stores an indicator associated with the purchaser that they have purchased the toy. The toy can then be downloaded and/or accessed on the mobile communication device.

The example secure element controller 135 of the illustrated example of FIG. 1 controls deployment of the tag processor 192 and/or the data store 194 to the secure element 185 of the mobile communication device 170. In the illustrated example, the example secure element controller 135 communicates via the communicator 155 and/or the communicator 180 of the mobile communication device 170, using over-the-air (OTA) protocols, to transmit data and/or instructions to the secure element 185 of the mobile communication device 170. In the illustrated example, OTA protocols are used to communicate with the secure element 185. However, in some examples, the secure element controller 135 may communicate with the secure element 185 using different communication format(s) such as, for example Ethernet packets, Wi-Fi, etc.

The access key controller 140 of the illustrated example of FIG. 1 controls access to the secure element 185 by updating an access key used to access the secure element 185. In the illustrated example, the example access key controller 140 determines an access key to be used by a toy manager 175 executing on the mobile communication device 175 when accessing the secure element 185. Via the secure element controller 135, the access key controller 140 of the illustrated example updates the access key stored on the secure element 185. When, for example an application executed by the mobile communication device does not have the access key and/or has an incorrect access key, access to functions and/or data stored in the secure element 185 and/or portions thereof may be restricted. The example access key controller 140 of FIG. 1 provides the access key to applications executing on the mobile communication device 170 to enable those applications to access the secure element 185. To deny access of those applications to the secure element 185, the access key controller 140 of the illustrated example may update the access key stored in secure element 185 such that the applications no longer have a valid access key.

The example tag provider 145 of the illustrated example of FIG. 1 provides tag data to the mobile communication device 170 for emulating a toy. In the illustrated example, the example tag provider 145 transmits tag data associated with a toy to the secure element 185 of the mobile communication device 170. In the illustrated example, the tag data is transmitted to the secure element 185 using OTA protocols. However, in some examples the tag data is transmitted to the secure element 185 via the toy manager 175 of the mobile communication device 170. That is, the example toy manager 175 may, in some examples, function as a proxy for tag data from the toy server 120 being transmitted to the secure element 185.

The example model provider 150 of the illustrated example of FIG. 1 provides model data (e.g., image data, avatar data, etc.) to the example mobile communication device 170 for displaying a representation of the toy associated with the model via a display of the mobile communication device 170. In the illustrated example, the example model provider 150 transmits model data associated with the toy to the toy manager 175. The model data may be used to, for example, display a representation (e.g., an avatar) of the toy being emulated, to display toys available for purchase via a toy store interface, to display a representation of a toy that has been identified via a scanning function of the mobile communication device 170, etc.

The example communicator 155 of the illustrated example of FIG. 1 communicates with the mobile communication device 170 via the network 165. In the illustrated example, the example communicator 155 facilitates transmission of data between the toy server 120 and a mobile communication device 170. In the illustrated example, data is transmitted using OTA protocols such as, for example ISO 7816-4. However, any other past, present, and/or future protocol and/or communication format may be used for transferring data and/or otherwise communicating with the mobile communication device 170 such as, for example, a hypertext transfer protocol (HTTP), an HTTP secure (HTTPS) protocol, a file access protocol, etc.

The toy data database 160 of the illustrated example of FIG. 1 may be implemented by any device for storing data such as, for example, flash memory, magnetic media, optical media, etc. Furthermore, the data stored in the toy data database 160 may be in any data format such as, for example, binary data, comma delimited data, tab delimited data, structured query language (SQL) structures, etc. While, in the illustrated example, the toy data database 160 is illustrated as a single database, the toy data database 160 may be implemented by any number and/or type(s) of databases. In the illustrated example, the toy data database 160 stores tag data and model data received from the toy manufacturer 105. However, any other data may additionally or alternatively be stored in the toy data database 160 such as, for example, transaction data, account data, business rules for processing transactions, sales information, etc.

The network 165 of the illustrated example of FIG. 1 is implemented by a wide area network (WAN) such as the Internet. However, in some examples, local networks may additionally or alternatively be used. For example, multiple networks may be utilized to couple the components of the example environment of FIG. 1.

The example mobile communication device 170 of the illustrated example of FIG. 1 is implemented by a smart phone. However, any other type of mobile communication device may additionally or alternatively be used such as, for example a personal digital assistant PDA, a tablet (e.g., an iPad), a laptop, etc. The example mobile communication device 170 of the illustrated example of FIG. 1 includes a display 171, a user input receiver 172, a toy manager 175, a communicator 180, and a secure element 185.

The example display 171 of the illustrated example of FIG. 1 displays interfaces for interaction with a user of the mobile communication device 170. The example display 171 of FIG. 1 is implemented by a thin film transistor (TFT) liquid crystal display (LCD) display. However, any other type of display technology may additionally or alternatively be used such as, for example, in-place switching (IPS) LCD, a light emitting diode (LED) display, an Active-Matrix Organic Light-Emitting Diode (AMOLED) display, etc.

The example user input receiver 172 of the illustrated example of FIG. 1 receives user input from a user of the mobile communication device 170. The example user input receiver 172 of FIG. 1 is implemented as a touchscreen input device in connection with the example display 171 (e.g., a touchscreen display). However, the example user input receiver 172 may be implemented by any other device such as, for example, a button, a keyboard, a mouse, a trackball, etc.

The example toy manager 175 of the illustrated example of FIG. 1 presents an interface allowing the user to select a toy for emulation. In some examples, the example toy manager 175 displays an example toy store to the user, thereby enabling the user to purchase additional toys for emulation. In some examples, the example toy manager 175 displays a scanning interface to the user, thereby enabling the user to scan physical toys such that they may be emulated at a later time.

The example communicator 180 of the illustrated example of FIG. 1 enables communication with the toy server 120 via the network 165. The example communicator 180 of FIG. 1 is implemented by a wireless radio. In the illustrated example, the example communicator 180 communicates with the network 165 using a cellular communication protocol such as, for example, code division multiple access (CDMA), WiMax, LTE, etc. However, any other past, present, and/or future communication protocol may additionally or alternatively be used such as, for example Wi-Fi, Bluetooth, etc.

The example secure element 185 of the illustrated example of FIG. 1 is implemented by tamper resistant circuitry for hosting applications and confidential and/or cryptographic data associated with those applications. In the illustrated example of FIG. 1, the example secure element 185 (e.g., a secure storage) is implemented using a universal integrated circuit card (UICC) such as, for example, a Subscriber Identity Module (SIM) card. However, the example secure element 185 may additionally or alternatively be implemented as an embedded secure element (e.g., circuitry that is not removable from the mobile communication device), a microSD card, etc. In some examples, the secure element is implemented using a software-based secure element using, for example, a Host Card Emulation (HCE) mode, a virtual secure element, etc. The example secure element 185 of the illustrated example of FIG. 1 includes a toy domain 190 for storing instructions and/or data received from the toy server 120. Additionally, the example secure element 185 includes a near field communication (NFC) radio 187.

The example toy domain 190 of FIG. 1 is a secure portion of the secure element 185 that is dedicated to instructions and/or data received from the toy server 120. Upon initialization of the secure element 185, the example secure element controller 135 of the example toy server 120 creates the toy domain 190 within the secure element 185.

The example toy domain 190 of the illustrated example includes a tag processor 192 and a data store 194. The example tag processor 192 executes instructions at the request of the toy manager 175 and/or the toy server 120. In some examples, the tag processor 192 verifies that an access code provided by the toy manager 175 is valid prior to executing the requested instructions. In some examples, the tag processor 192 controls operations of the NFC radio 187 to, for example, instruct the example NFC radio 187 to emulate and/or broadcast a particular tag, instruct the example NFC radio 187 to read a tag within proximity of the NFC radio 187, etc.

The example data store 194 of the illustrated example of FIG. 1 may be implemented by any device for storing data such as, for example, flash memory, magnetic media, optical media, etc. Furthermore, the data stored in the example data store 194 may be in any data format such as, for example, binary data, comma delimited data, tab delimited data, structured query language (SQL) structures, etc. While, in the illustrated example, the data store 194 is illustrated as a single database, the data store 194 may be implemented by any number and/or type(s) of databases. In the illustrated example, the data store 194 stores tag data to be emulated by the NFC radio 187. In some examples, the NFC radio 187 receives data to be written to a tag (e.g., in-game progress data) and, as such, stores the received data to the data store 194 in association with the tag. In some examples, the example data store 194 stores the access key that is used to validate whether a received instruction should be performed by the tag processor 192.

The example 3D printer 197 of the illustrated example of FIG. 1 is implemented by a commercial 3D printing service. However, the example 3D printer 197 may alternatively be implemented by a 3D printing device. For example, the 3D printer may be implemented by a personal 3D printer (e.g., a MakerBot 3D printer, etc.). In the illustrated example, the 3D printer 197 produces the example 3D printed toy 116. The example 3D printer 197 receives model information (e.g., blueprint information) from the toy manager 175 for printing the example 3D printed toy 116. In the illustrated example, the model information is formatted as a point cloud. However any other type(s) of three dimensional model or model data format(s) may additionally or alternatively be used.

In the illustrated example, the model data is the model data provided by the model provider 150. As such, the 3D printed model looks similar to and/or mimics the toy 115. In some examples, the 3D printer 197 allows the user to modify and alter the model to be printed. For example, the user may instruct the 3D printer that a different material be used to print the toy, that different color be used, that a different size and/or scale be used, etc. In the illustrated example, the 3D printer 197 embeds a tag into the 3D printed toy 116. The example 3D printer 197 of the example of FIG. 1 configures the embedded tag so that it may be used in connection with the NFC reader 112 and/or the videogame.

Figure 2:
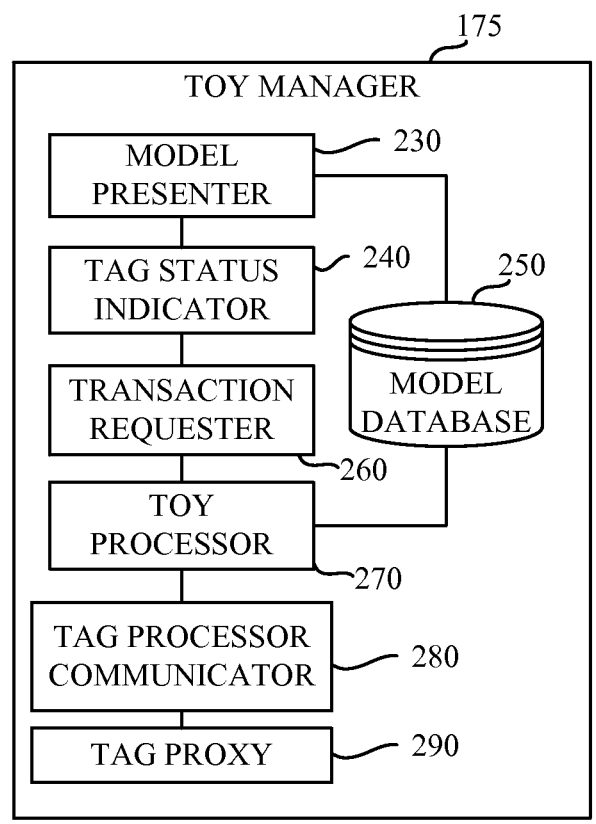
FIG. 2 is a block diagram of an example implementation of the example toy manager of FIG. 1.

FIG. 2 is a block diagram of the example toy manager 175 of FIG. 1. In the illustrated example of FIG. 2, the example toy manager 175 includes a model presenter 230, a tag status indicator 240, a model database 250, a transaction requester 260, a toy processor 270, a tag processor communicator 280, and a tag proxy 290.

The example model presenter 230 of the illustrated example of FIG. 2 presents models of toys via the display 171. In the illustrated example, the example model presenter 230 renders an image of the model associated with the toy. The example image is rendered to appear as a three dimensional image on a two dimensional display. The three dimensional image is generated based on the model (e.g., a three dimensional model). In some examples, the three dimensional image may be manipulated (e.g., zoomed in, rotated, etc.). In some examples, the image rendered by the model presenter 230 is a two dimensional image based on the model.

The example tag status indicator 240 of the illustrated example of FIG. 2 displays an indicator of whether a tag associated with a toy is being emulated by the NFC radio 187. In the illustrated example, the example tag status indicator 240 determines whether a tag associated with a toy is activated for emulation by the NFC radio 187. Based on whether the toy is activated for emulation, the example tag status indicator 240 of FIG. 2 controls the display 171 to present the identified status to the user.

The example model database 250 of the illustrated example of FIG. 2 may be implemented by any device for storing data such as, for example, flash memory, magnetic media, optical media, etc. Furthermore, the data stored in the model database 250 may be in any data format such as, for example, binary data, comma delimited data, tab delimited data, structured query language (SQL) structures, etc. While, in the illustrated example, the model database 250 is illustrated as a single database, the model database 250 may be implemented by any number and/or type(s) of databases. In the illustrated example, the model database 250 stores model data received from the model provider 150 of the example toy server 120. In the illustrated example, the model is a three dimensional model representing a toy. However, in some examples, the model is a two dimensional model (e.g., a planar image) representing the toy.

The example transaction requester 260 of the illustrated example of FIG. 2 interacts with the transaction processor 130 of the toy server 120 to request a transaction to be processed. In the illustrated example, the example transaction requester 260 requests transactions to be processed by the transaction processor 130 to, for example, purchase a toy, to transfer a toy to a different mobile communication device, to scan a toy, etc.

The example toy processor 270 of the illustrated example of FIG. 2 communicates with the tag processor 192 of the example secure element 185. In the illustrated example, the example toy processor 270 controls the interface generated by the display 171. For example, the example toy processor 270 of FIG. 2 controls the display 171 to present a toy box interface, a toy store interface, and/or a toy scanning interface. However, any other interface may additionally or alternatively be displayed. In the illustrated example, the toy processor 270 interacts with the access key controller 140 of the example toy server 120 to retrieve an access key to be used by the toy processor communicator 280 when communicating with the toy processor 192. In some examples, before retrieving the key, the toy processor 270 requests a password and/or other identifying information from the user to verify that the access key should, in fact, be retrieved (e.g., key retrieval is authorized).

The example tag processor communicator 280 of the illustrated example of FIG. 2 communicates with the tag processor 192. In the illustrated example, the example tag processor communicator 280 communicates with the example tag processor 192 to instruct the example tag processor 192 to activate a tag for emulation at the direction of the example toy processor 270. However, any other functions may additionally or alternatively be performed such as, for example, determining whether a tag is being emulated, determining which tags are installed, etc.

In the illustrated example, the example tag processor communicator 280 communicates with the tag processor 192 using an ISO-7814 standard. However, any other past, present, and/or future standard for communicating with the tag processor 192 and/or, more generally, the example secure element 185, may additionally or alternatively be used. For example the secure element 185 may implement the MIFARE ISO/IED 14443-3 Type A protocol. In some examples, the tag processor communicator 280 interacts with the tag processor 192 using an application programming interface (API) and, accordingly, the example tag processor communicator 280 may communicate with the tag processor 192 using the MIFARE4Mobile API.

In the illustrated example, the tag processor communicator 280 transmits the access key to the tag processor 192. The access key enables the tag processor 192 to confirm that the tag processor communicator 280 has permission (e.g., authorization) to access the tag processor 192. The access key(s) stored by the tag processor 192 (e.g., stored in the example data store 194), and may be modified by the access key controller 140 of the example toy server 120 to control access of the tag processor communicator 280 to control access to the example tag processor 192 by the tag processor communicator 280. In some examples (e.g., if a valid key is not presented), the tag processor communicator 280 may request that the toy processor 270 of the example toy manager 175 contact the toy server to obtain a valid access key. In the illustrated example, the access key is transmitted with each request sent to the tag processor 192. However, in some examples, the access key may be transmitted upon initialization of a communication session with the tag processor 192 and not included with every request. For example, the tag processor communicator 280 may send the access key followed by two or more instructions and/or requests for data to the tag processor 192.

The tag proxy 290 of the illustrated example of FIG. 2 relays data from the toy server 120 to the secure element 185. In some examples, the example tag status indicator 240, the example model presenter 230, the example transaction requester 260, the example toy processor 270, the example tag processor communicator 280, and the example tag proxy 290 of the illustrated example of FIG. 2 may be implemented together (e.g., using a same physical processor). When the example toy server 120 of FIG. 1 communicates with the secure element 185, in some examples at least a subset of the communications may be performed using OTA protocols. For example, the example toy server 120 may install the toy domain 190 and/or the tag processor 192, may update and/or access the key for accessing the tag processor, and/or may delete the toy domain and/or tag processor from the secure element 185 using the OTA protocols. However, in some examples, the toy server 120 may not be able to update tag data within the toy domain 190 using the OTA protocols. As such, the example toy server may communicate with the secure element 185 and/or the tag processor 192 via the example tag proxy 290. In the illustrated example, the example tag proxy 290 relays instructions and/or queries from the toy server 120 to the tag processor 192. For example, when the toy server 120 communicates with the tag processor 192 to install a tag associated with the toy, the example toy server 120 may communicate via the tag proxy 290.

Figure 3:
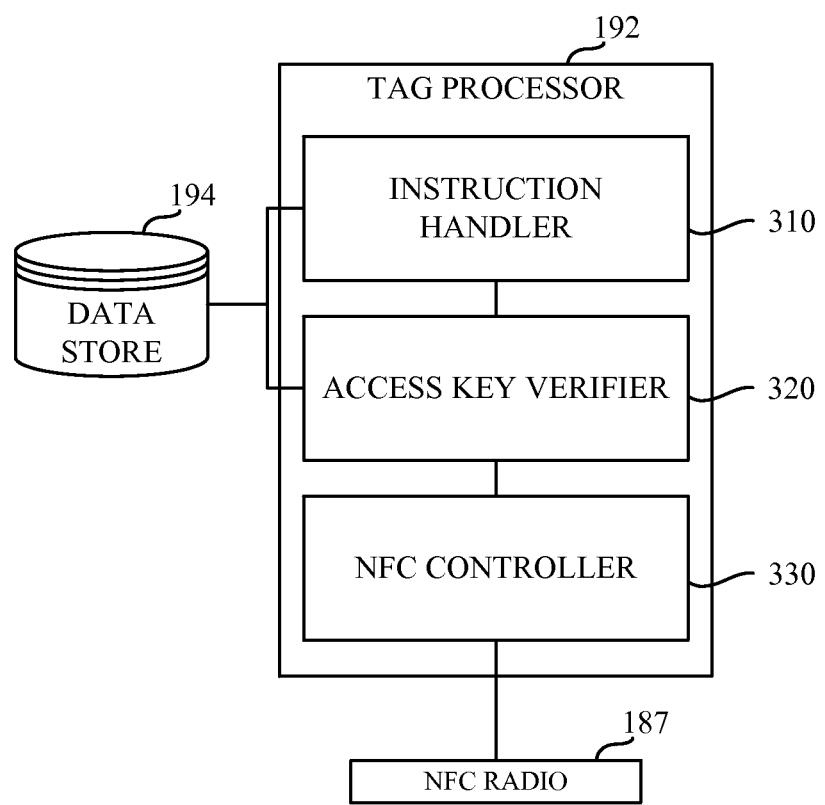
FIG. 3 is a block diagram an example implementation of the example tag processor of FIG. 1.

FIG. 3 is a block diagram of an example implementation of the example tag processor 192 of FIG. 1. In the illustrated example of FIG. 3, the example tag processor 192 includes an instruction handler 310, an access key verifier 320, and an NFC controller 330. The example tag processor 192 of this example is installed within the toy domain 190 and interacts with the data store 194 to store and/or retrieve data securely within the secure element 185.

The example instruction handler 310 of the illustrated example of FIG. 3 receives instructions from the tag processor communicator 280 and/or from the communicator 155 of the example toy server 120. In some examples, the instruction handler 310 receives instructions from the toy server 120 to, for example, update an access key to be used to validate requests (e.g., a request to activate and/or deactivate a tag, etc.) received from the example tag processor communicator 280. In the illustrated example, the instruction handler 310 is implemented according to the MIFARE4Mobile specification. However, any other past, present, or future specification(s) and/or standard(s) type of implementation may additionally or alternatively be used.

The example access key verifier 320 of the illustrated example of FIG. 3 verifies an access key received from the tag processor communicator 280. In the illustrated example, the access key verifier 320 receives an access key from the tag processor communicator 280 and verifies the received access key against an access key stored in the data store 194 (e.g., an access key provided by the access key controller 140 of the example toy server 120). If the provided access key is valid (e.g., the provided access key matches the stored access key), access is granted to the tag processor communicator 280 and the instruction handler 310 is allowed to process the received instruction(s). If the provided access key is not valid, the access key verifier 320 prevents the received instructions from being executed by the instruction handler 310.

The example NFC controller 330 of the illustrated example of FIG. 3 controls the NFC radio 187. In the illustrated example, the example NFC controller 330 controls the NFC radio 187 to, for example, emulate a tag stored in the data store 194. In some examples, the NFC controller 330 may additionally or alternatively instruct the NFC radio 187 to read a tag within proximity of the NFC radio 187.

Figure 4:
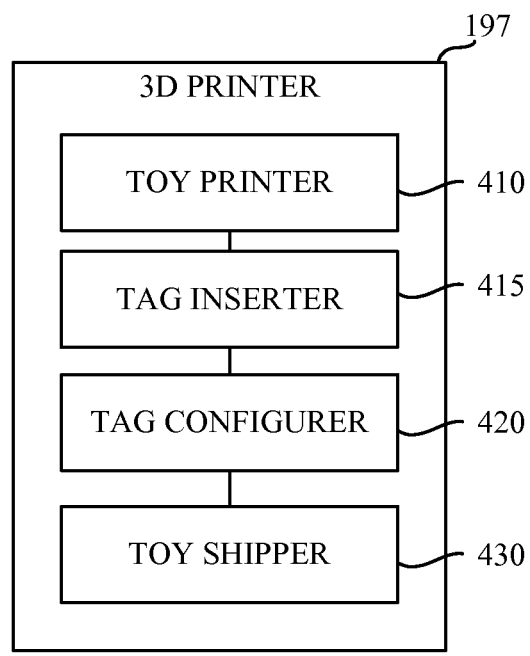
FIG. 4 is a block diagram an example implementation of the example 3D printer of FIG. 1.

FIG. 4 is a block diagram of an example implementation of the example 3D printer 197 of FIG. 1. In the illustrated example of FIG. 4, the example 3D printer 197 includes a toy printer 410, a tag inserter 415, a tag configurer 420, and a toy shipper 430.

The example toy printer 410 prints toys based on a toy model (e.g., a blueprint) received from the toy processor 270 and/or from the model provider 150. The example toy printer 410 is implemented using an additive manufacturing process such as, for example, fused deposition modeling (FDM). However, any other printing technology may additionally or alternatively be used such as, for example, stereo lithography printing, selective laser sintering (SLS) printing, subtractive manufacturing, etc. In the illustrated example of FIG. 4, the toy printer 410 prints using thermoplastic printed material such as, for example polylactic acid (PLA) and/or Acrylonitrile butadiene styrene (ABS) plastics. However, any other type of print material may additionally or alternatively be used such as, for example, metals, glass, clay, etc.

The example tag inserter 415 of FIG. 4 inserts a tag in the 3D printed toy 116. In the illustrated example of FIG. 4, the tag is embedded within the 3D printed toy 116 during printing. In the illustrated example, the tag is an NFC tag. However, any other type of tag may additionally or alternatively be used such as, for example, a radio frequency identification (RFID) tag, a barcode, etc. In the illustrated example, the tag inserter 415 positions the tag such that it is embedded within a base of the printed toy 116. However, the tag may be inserted in any other location such as, for example, within a body of the toy, on an exterior of the toy, etc.

In the illustrated example, the tag includes a memory and is responsive to NFC signals to import and/or export data. The example tag configurer 420 of the illustrated example of FIG. 4 configures the tag such that the tag may be used to interface with the tag reader 112. In the illustrated example, the example tag configurer 420 is implemented using an NFC radio to write the tag data to the tag.

The example toy shipper 430 of the illustrated example of FIG. 4 packages the printed toy for shipping to a customer (e.g., a user that requested the toy be printed). In the illustrated example, the toy shipper 430 is implemented using an automated packaging machine. However, the printed toy 116 may be packaged in any other way. For example, the printed toy 116 may be packaged by hand. In the illustrated example, the toy shipper 430 prints a shipping label for the toy and ships the packaged toy to the customer via, for example, a commercial shipping service such as FedEx and/or UPS. However, any other shipping method may additionally or alternatively be used.

Figure 5:
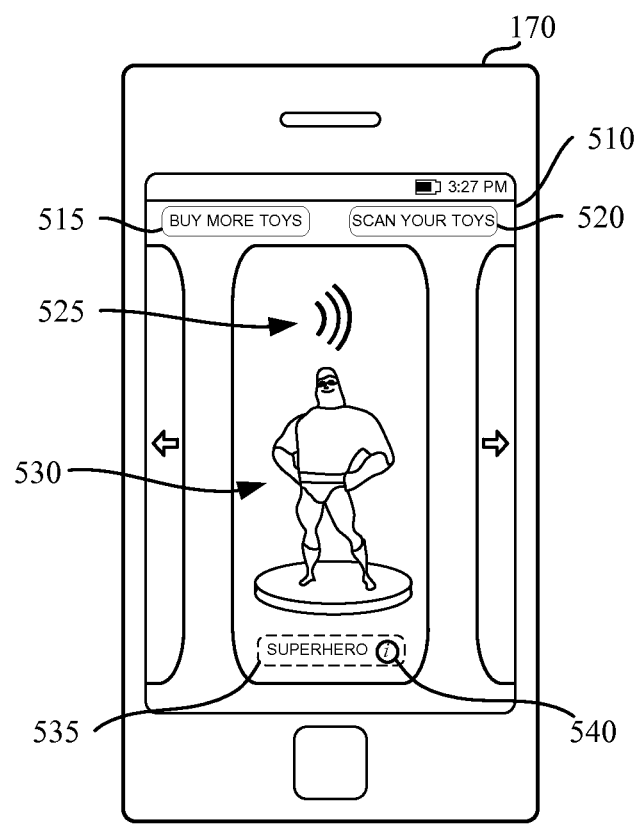
FIGS. 5, 6, 7, and 8 are example interfaces that may be displayed by the example toy manager of FIGS. 1 and/or 2.

FIG. 5 illustrates an example interface 510 that may be displayed by the example toy manager 175 of FIGS. 1 and/or 2. The example interface 510 of the illustrated example of FIG. 5 is a toy box interface. In the illustrated example, the toy box interface 510 presents toys to the user that may be selected for emulation.

Figure 7:
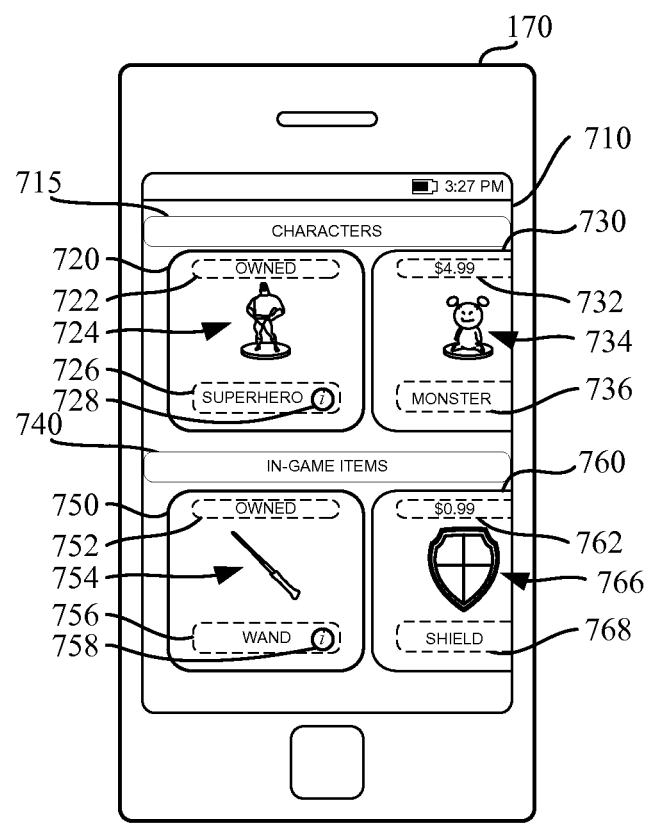

In the illustrated example, the toy box interface 510 includes a first "Buy More Toys" button 515 to allow the user to navigate to a toy store interface (e.g., the example toy store interface of FIG. 7). The example toy box interface 510 includes a second "Scan your Toys" button 520 to allow the user to navigate to a toy scanning interface (e.g., the example toy scanning interface of FIG. 8).

In the illustrated example of FIG. 5, the example toy box interface 510 includes an indicator 525 that displays whether the toy is actively being emulated by the mobile communication device 170. The example toy box interface 510 includes an avatar 530 of the toy being emulated. Displaying an avatar (e.g., a model and/or a representation) of the emulated toy enables the user to quickly navigate through the toy box interface 510 to select a toy to be emulated. For example, in the illustrated example of FIG. 5, the user may scroll left or right to select a different toy for emulation. However, any other way of navigating through the toy box interface (e.g., a menu, swiping up and down, etc.) may additionally or alternatively be used.

In the illustrated example of FIG. 5 the example toy box interface 510 includes a toy name 535. The toy represented in the illustrated example of FIG. 5 is a superhero. As such, the name 535 indicates the name of the toy as "SUPERHERO". However, any other information may additionally or alternatively be displayed. Moreover, any other avatar 530 may additionally or alternatively be displayed. In the illustrated example, the avatar 530 and the name 535 correspond to each other. In the illustrated example of FIG. 5, the example toy box interface 510 includes an information button 540. The information button 540, once selected, presents information to the user regarding the toy that is displayed. For example, the user may be presented with information regarding when the toy was purchased, special in-game abilities associated with the toy, etc.

Figure 6:
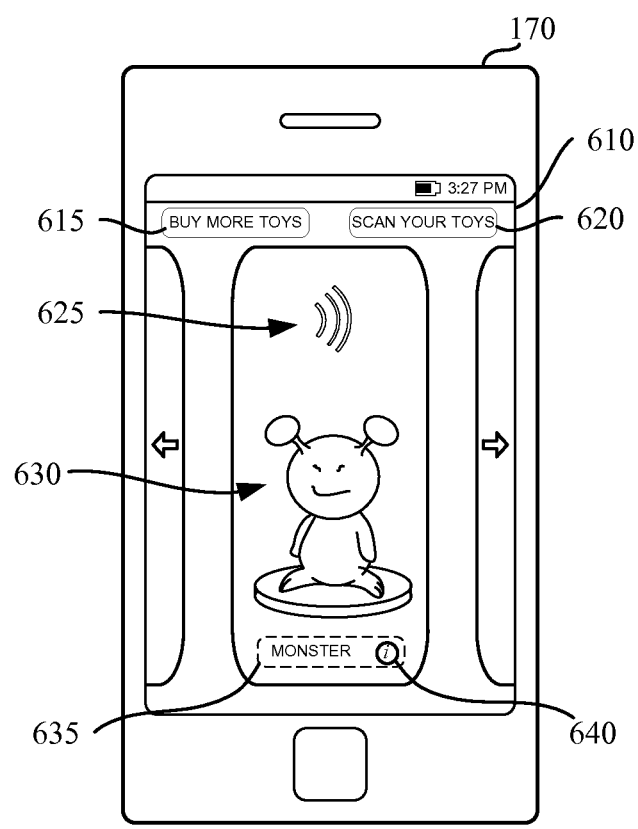

FIG. 6 illustrates an example interface 610 that may be displayed by the example toy manager 175 of FIGS. 1 and/or 2. The example interface 610 depicts a second toy different from the first toy displayed in the example toy box interface of FIG. 5. Referring back to FIG. 5, the indicator 525 of FIG. 5 is activated, indicating that the first toy 530 of FIG. 5 is being emulated. In contrast, the indicator 625 of FIG. 6 is not activated, indicating that the second toy 630 FIG. 6 is not being emulated. In the illustrated example of FIG. 6, the second toy 630 is a monster. However, any other toy may additionally or alternatively be used. In the illustrated example of FIG. 6, the example toy store interface 610 displays a name 635 of the presented toy 630. In the illustrated example of FIG. 6, the example toy store interface 610 displays an information button 640 which, when selected, presents the user with information regarding the displayed toy.

FIG. 7 illustrates an example interface 710 that may be displayed by the example toy manager 175 of FIGS. 1 and/or 2. The example interface 710 of the illustrated example of FIG. 7 is a toy store interface. The example toy store interface 710 enables a user to browse toys that are available for purchase, and/or view toys that are already owned. In examples disclosed herein, ownership of various toys is determined by querying transaction processor 130 to determine which toys are owned by and/or associated with the mobile communication device 170 (and/or a user associated with the mobile communication device 170). In some examples, toys are offered for sale via the toy store interface that are not otherwise offered for sale via traditional retail outlets (e.g., at a retail brick-and-mortar store). In the illustrated example, the toy store interface 710 includes two sections. A first section 715 represents different characters for sale. The second section 740 represents different in-game items for sale.

The first example section 715 displays a first toy 720. The example toy store interface 710 includes an ownership indicator 722, a depiction 724 of the first toy 720, a name 726 of the first toy 720, and an information button 728. In the illustrated example of FIG. 7, the ownership indicator 722 indicates that the first toy 720 is already owned by the user. In the illustrated example of FIG. 7, the name 726 and the depiction 724 indicate that the first toy 720 is a superhero. However, any other toy having any other name and/or depiction may additionally or alternatively be used. The first example section 715 also displays a second toy 730. The second example toy 730 includes a price indicator 732, a depiction 734 of the second toy 720, and a name 736 of the second toy 730. In the illustrated example, the second toy 730 is different from the first toy 720. In the illustrated example of FIG. 7, the user navigates between toys by swiping to the left and/or right. However, any other method of navigating the example toy store interface 710 may additionally or alternatively be used.

In the illustrated example, the price indicator 732 indicates a sales price of $4.99 (US). However, any other price may additionally or alternatively be used. In examples disclosed herein, the sales price is displayed in accordance with sales instructions received from the toy manufacturer 105. For example, the toy manufacturer 105 may set a price of a toy purchased via the example toy store interface 710. In some examples, the price of the toy when purchased through this toy store interface 710 may be different than a price of the toy when purchased through a different retail establishment (e.g., a brick-and-mortar store).

The second example section 740 displays a first in-game item 750 and a second in-game item 760. In the illustrated example, the first in-game 750 item includes an ownership indicator 752, a depiction of the first in-game item 754, a name of the in-game item 756, and an information button 758. In the illustrated example, the ownership indicator 752 indicates that the in-game item is owned by the user. In the illustrated example of FIG. 7, the first in-game item 750 is a wand. However, any other type of item may additionally or alternatively be used. Different in-game items made produce different effects. For example, running boots may make a character run faster in the videogame, whereas a shield may make the character resilient to damage. The second example section 740 also displays the second in-game item 760. The second in-game item is displayed in association with a price indicator 762, a depiction of the item 764, and a name of the item 766. In the illustrated example, the second in-game item 760 is a shield. However, any other type(s) of item(s) may additionally or alternatively be used.

Figure 8:
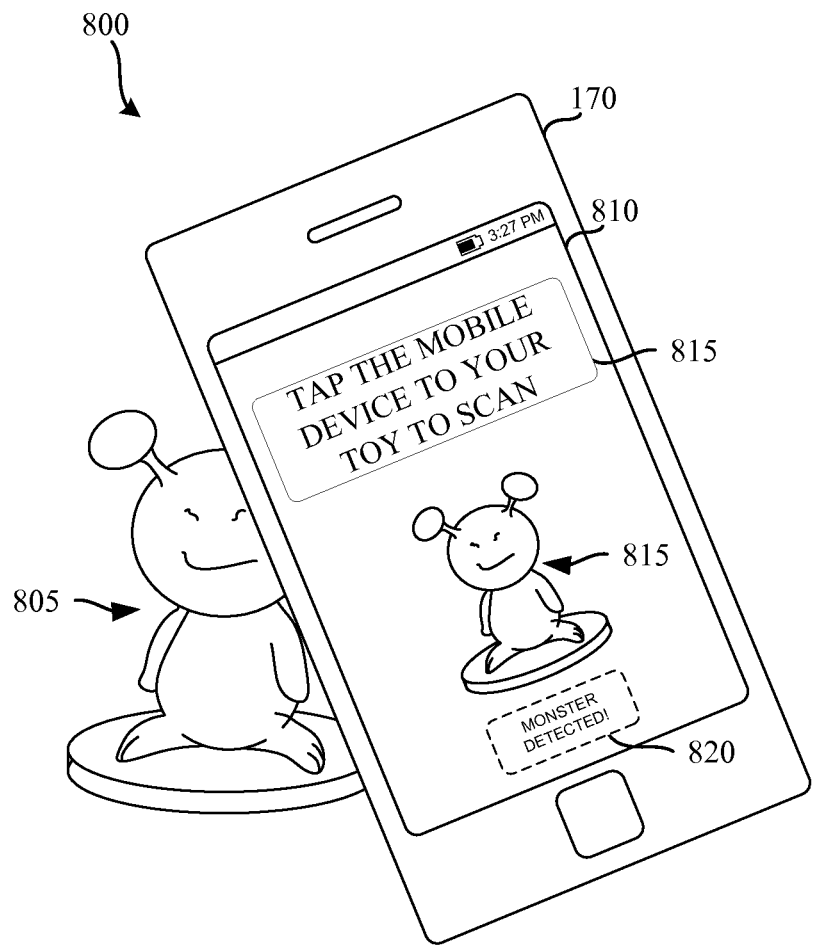

FIG. 8 illustrates an example interface 810 that may be displayed by the example toy manager 175 of FIGS. 1 and/or 2. In the illustrated example of FIG. 8, the example interface 810 is a scanning interface. The example scanning interface 810 enables the user to scan an example physical toy 805 so that it may be identified and then emulated by the mobile communication device 170. In the illustrated example of FIG. 8, the example scanning interface 810 includes a scanning instruction 812, a depiction of the detected toy 815, and an indicator 820. The example scanning instruction 812 instructs the user to place the mobile communication device 170 within proximity of the toy to be scanned 805. In the illustrated example, the mobile communication device 170 is to be held within six inches of the toy 805. However, any other distance may additionally or alternatively be used. If, for example, the toy is not detected while the user has been instructed to scan the toy, a dialogue may be displayed further instructing the user to place the mobile communication device 170 closer to the toy 805 (e.g., the toy may not be within scanning proximity of the mobile communication device 170). Once the example toy 805 is detected, the depiction of the detected toy 815 may be displayed. In some examples, multiple toys maybe near and/or within proximity of the mobile communication device 170. Displaying the depiction of the identified toy 815, enables the user to confirm that the intended toy has been identified. In the illustrated example, the indicator 820 identifies that the monster was detected. However, any other indication may additionally or alternatively be used.

Because the NFC scanning range of most mobile communication devices is a few inches, tags embedded within toys may be scanned while the toy is still in its retail packaging. In some examples, before a toy can be added to the mobile communication device for emulation, the user may be requested to confirm a detail about the toy. For example, the user may be requested to enter confirmation code that may appear on the bottom of the toy that is not visible while the toy is still in its retail packaging. Such confirmation may avoid theft by preventing users from adding toys while, for example, the toy is still in its retail packaging and/or on a shelf at a retail toy store. In some examples, the confirmation code is transmitted to the transaction processor 130 to verify that the identified toy matches the provided confirmation code.

While an example manner of implementing the toy server 120 of FIG. 1, the example toy manager 175 of FIGS. 1 and/or 2, the example tag processor 192 of FIGS. 1 and/or 3, and/or the example 3D printer 197 of FIGS. 1 and/or 4 are illustrated in FIGS. 1, 2, 3, and/or 4, one or more of the elements, processes and/or devices illustrated in FIGS. 1, 2, 3, and/or 4 may be combined, divided, re-arranged, omitted, eliminated and/or implemented in any other way. Further, the example toy data receiver 125, the example transaction processor 130, the example secure element controller 135, the example access key controller 140, the example tag provider 145, the example model provider 150, the example communicator 155, the example toy data database 160, the example toy server 120 of FIG. 1, the example model presenter 230, the example tag status indicator 240, the example model database 250, the example transaction requester 260, the example toy processor 270, the example tag processor communicator 280, the example tag proxy 290, the example toy manager 175 of FIGS. 1 and/or 2, the example instruction handler 310, the example access key verifier 320, the example NFC controller 330, the example tag processor 192 of FIGS. 1 and/or 3, the example toy printer 410, the example tag inserter 415, the example tag configurer 420, the example toy shipper 430, and/or, the example 3D printer 197 of FIGS. 1 and/or 4 may be implemented by hardware, software, firmware and/or any combination of hardware, software and/or firmware. Thus, for example, any of the example toy data receiver 125, the example transaction processor 130, the example secure element controller 135, the example access key controller 140, the example tag provider 145, the example model provider 150, the example communicator 155, the example toy data database 160, the example toy server 120 of FIG. 1, the example model presenter 230, the example tag status indicator 240, the example model database 250, the example transaction requester 260, the example toy processor 270, the example tag processor communicator 280, the example tag proxy 290, the example toy manager 175 of FIGS. 1 and/or 2, the example instruction handler 310, the example access key verifier 320, the example NFC controller 330, the example tag processor 192 of FIGS. 1 and/or 3, the example toy printer 410, the example tag inserter 415, the example tag configurer 420, the example toy shipper 430, and/or, the example 3D printer 197 of FIGS. 1 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example toy data receiver 125, the example transaction processor 130, the example secure element controller 135, the example access key controller 140, the example tag provider 145, the example model provider 150, the example communicator 155, the example toy data database 160, the example model presenter 230, the example tag status indicator 240, the example model database 250, the example transaction requester 260, the example toy processor 270, the example tag processor communicator 280, the example tag proxy 290, the example instruction handler 310, the example access key verifier 320, the example NFC controller 330, the example toy printer 410, the example tag inserter 415, the example tag configurer 420, and/or the example toy shipper 430 is/are hereby expressly defined to include a tangible computer readable storage device or storage disk such as a memory, a digital versatile disk (DVD), a compact disk (CD), a Blu-ray disk, etc. storing the software and/or firmware. Further still, the example toy server 120 of FIG. 1, the example toy manager 175 of FIGS. 1 and/or 2, the example tag processor 192 of FIGS. 1 and/or 3, and/or the example 3D printer 197 of FIGS. 1 and/or 4 may include one or more elements, processes and/or devices in addition to, or instead of, those illustrated in FIGS. 1, 2, 3, and/or 4, and/or may include more than one of any or all of the illustrated elements, processes and devices.

Figure 20:
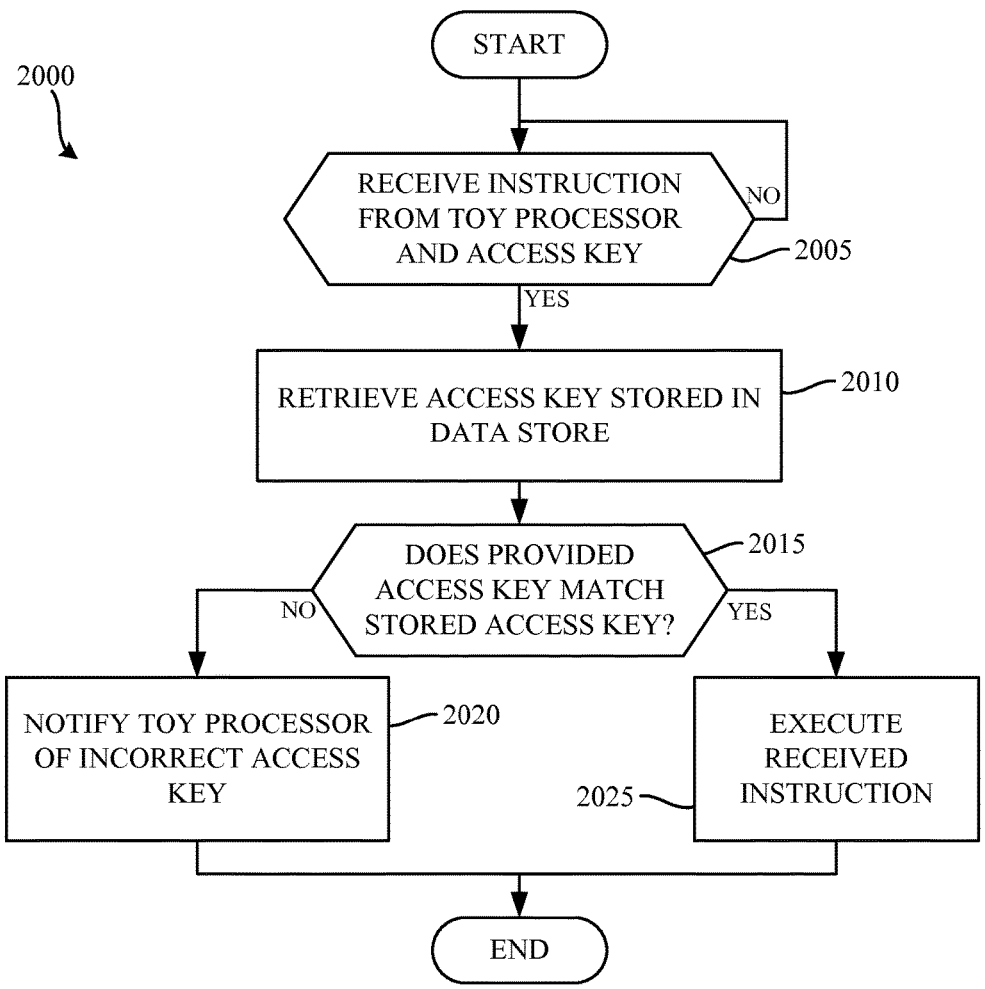
FIG. 20 is a flowchart representative of example machine-readable instructions which may be executed to implement the example tag processor of FIGS. 1 and/or 3 to emulate a toy.
Figure 21:
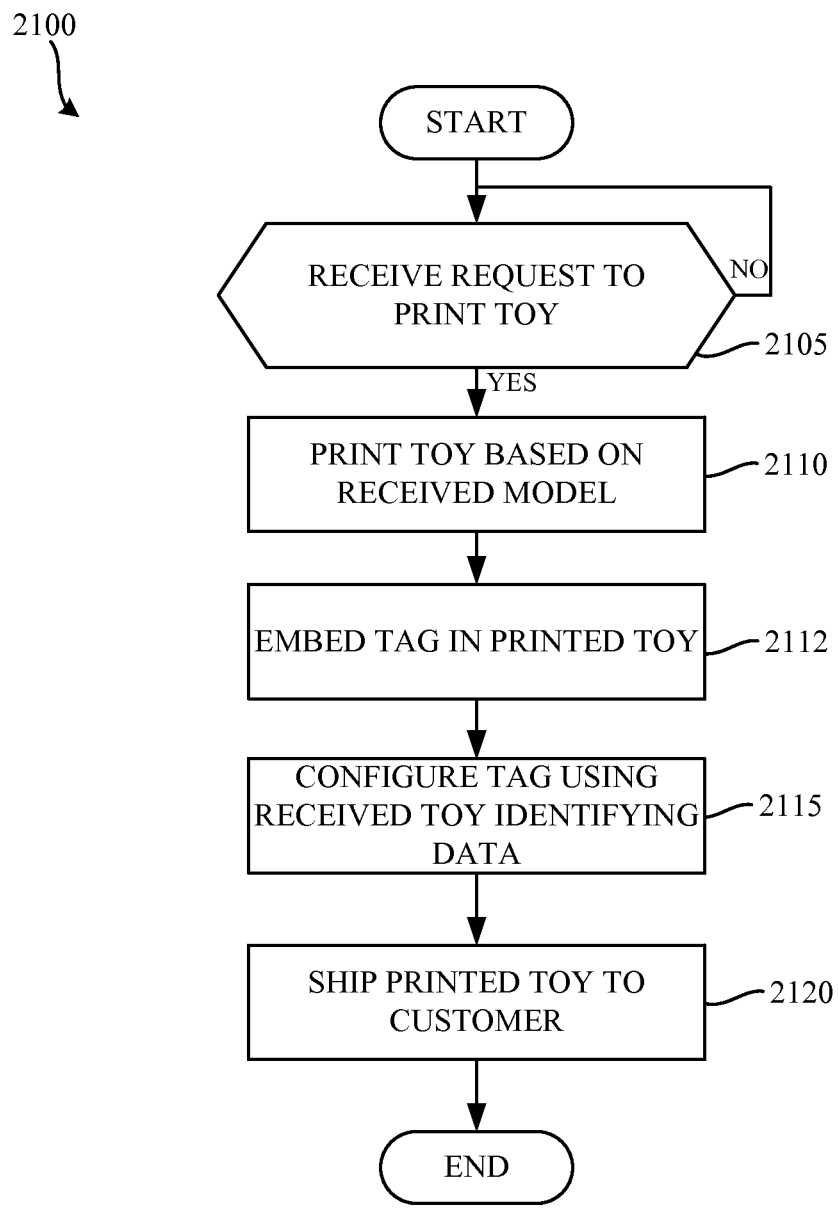
FIG. 21 is a flowchart representative of example machine-readable instructions which may be executed to implement the example 3D printer of FIGS. 1 and/or 4 to create a toy.

Flowcharts representative of example machine-readable instructions for implementing the example toy manager of FIGS. 1 and/or 2 are shown in FIGS. 9, 10, 11, 12, 13, and/or 14. Flowcharts representative of example machine-readable instructions for implementing the example toy server 120 of FIG. 1 are shown in FIGS. 15, 16, 17, 18, and/or 19. A flowchart representative of machine-readable instructions for implementing the example tag processor 192 of FIGS. 1 and/or 3 is shown in FIG. 20. A flowchart representative of example machine-readable instructions for implementing the example 3D printer of FIGS. 1 and/or 4 is shown in FIG. 21. In these examples, the machine readable instructions comprise a program(s) for execution by a processor such as the processor 2212 shown in the example processor platform 2200 discussed below in connection with FIG. 22. The program(s) may be embodied in software stored on a tangible computer readable storage medium such as a CD-ROM, a floppy disk, a hard drive, a digital versatile disk (DVD), a Blu-ray disk, or a memory associated with the processor 2212, but the entire program(s) and/or parts thereof could alternatively be executed by a device other than the processor 2212 and/or embodied in firmware or dedicated hardware. Further, although the example program is described with reference to the flowcharts illustrated in FIGS. 9, 10, 11, 12, 13, 14, 15, 16, 17, 18, 19, 20, and/or 21, many other methods of implementing the example toy server 120, the example toy manager 175, the example tag processor 192, and/or the example 3D printer 197 may alternatively be used. For example, the order of execution of the blocks may be changed, and/or some of the blocks described may be changed, eliminated, or combined.

As mentioned above, the example processes of FIGS. 9, 10, 11, 12, 13, 14, 15, 16, 17, 18, 19, 20, and/or 21 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9, 10, 11, 12, 13, 14, 15, 16, 17, 18, 19, 20, and/or 21 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
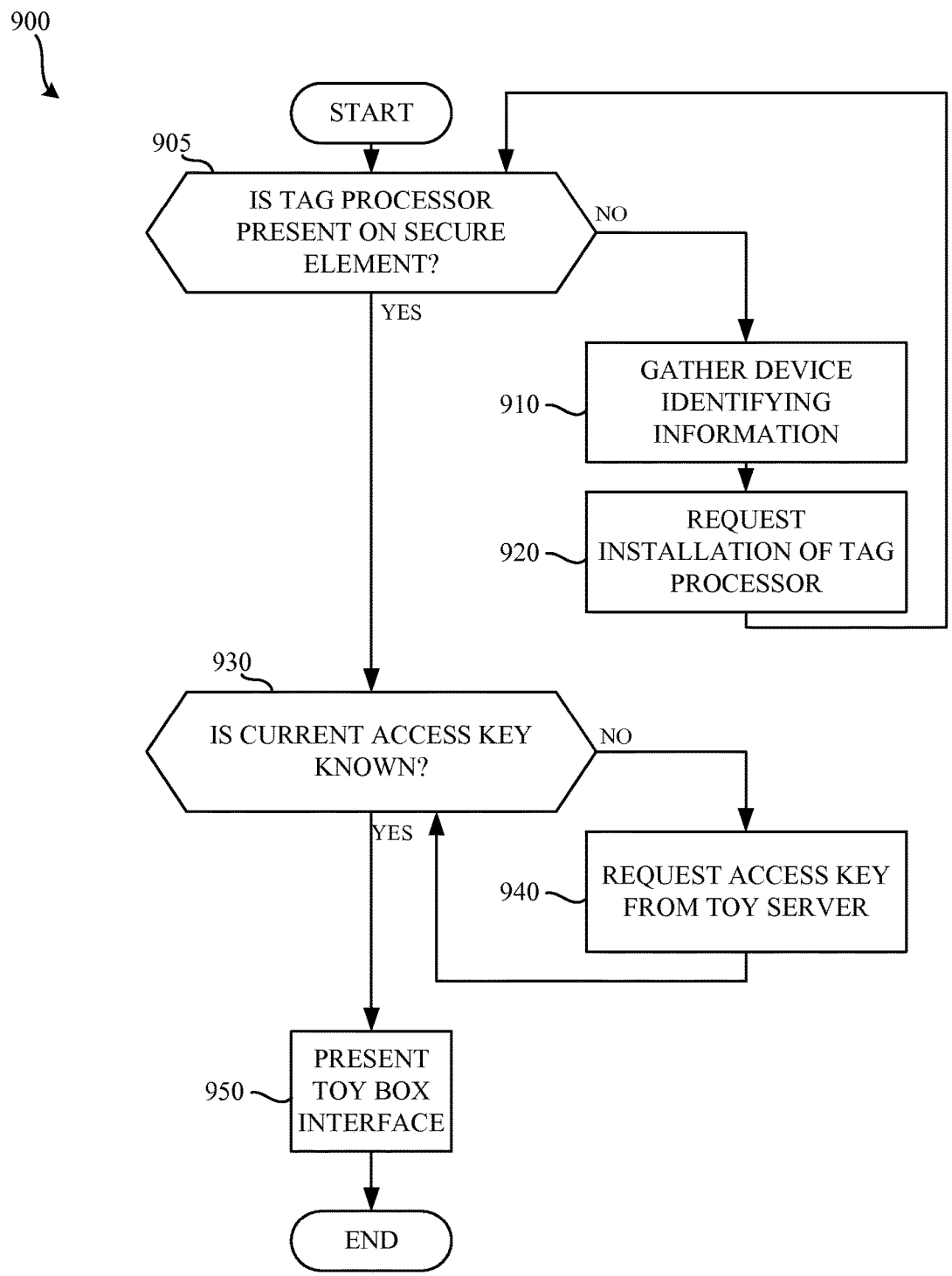
FIG. 9 is a flowchart representative of example machine-readable instructions which may be executed to implement the example toy manager of FIGS. 1 and/or 2 to initialize the example tag processor of FIGS. 1 and/or 3.

FIG. 9 is a flowchart representative of example machine-readable instructions which may be executed to implement the example toy manager 175 of FIGS. 1 and/or 2 and to initialize the example tag processor 192 of FIGS. 1 and/or 3. The example program 900 of FIG. 9 begins at block 905 when the toy processor 270 determines, via the tag processor communicator 280, whether the tag processor 192 is present on the secure element 185 (block 905). If the tag processor 192 is not present on the secure element 185, the example toy processor 270 gathers device identifying information (block 910). In the illustrated example, the toy processor 270 gathers device identifying information by reading a smart card serial number from the secure element 185. The smart card serial number is a unique identifier that is used to manage secure elements provided by a smart card distributor (e.g., a mobile network operator (MNO) such as a wireless carrier, a trusted service manager (TSM)). The MNO is generally in charge of managing smart card contents of its mobile subscribers. However, any other device identifying information may additionally or alternatively be used such as, for example, a media access control (MAC) address, a username, a device name, etc.

The example toy processor 270 of FIG. 2 then requests installation of the tag processor 192 from the toy server 120 (block 920). When requesting installation of the tag processor 192, the example toy processor 270 provides the device identifying information to the example toy server 120. The example toy server 120 communicates with the secure element 185 to install the tag processor 192. When installing the tag processor 192, the toy server 120 creates an access key to be used when accessing the tag processor 192. Control then returns to block 905 where the toy processor 270 determines whether the tag processor 192 is present on the secure element 185 (block 905).

Once the toy processor 270 confirms that the tag processor 192 is installed (block 905), the toy processor 270 determines whether the current access key for accessing the tag processor 192 is known (block 930). In some examples, the toy processor 270 determines whether the current access key is known by transmitting a dummy request to the tag processor 192 via the tag processor communicator 280. A response to the dummy request enables verification of whether valid access can be granted. If the toy processor 270 determines that the current access key is not known (e.g., the dummy request fails to return a valid response, the dummy request is rejected), the example toy processor 270 requests the access key from the toy server 120 (block 940). In some examples, the toy processor 270 transmits additional credential data to the toy server 120 to request the access key. Such additional credential data may enable the toy server 120 to confirm that the access key should be given to the toy processor 270. In some examples, the credential data is a username and a password of the user of the mobile communication device 170. However, the credential data may be any other type of data such as, for example, a certificate, a user identifier, etc. Control returns to block 930 where the toy processor 270 determines whether the current access key is known. When the current access key is known by the toy processor 270 (block 930) control proceeds to block 950 where the toy processor 270 presents the toy box interface (e.g., the toy box interface 510 of FIG. 5, the toy box interface 610 FIG. 6, etc.) via the display 171 (block 950). The process of FIG. 9 then ends.

Figure 10:
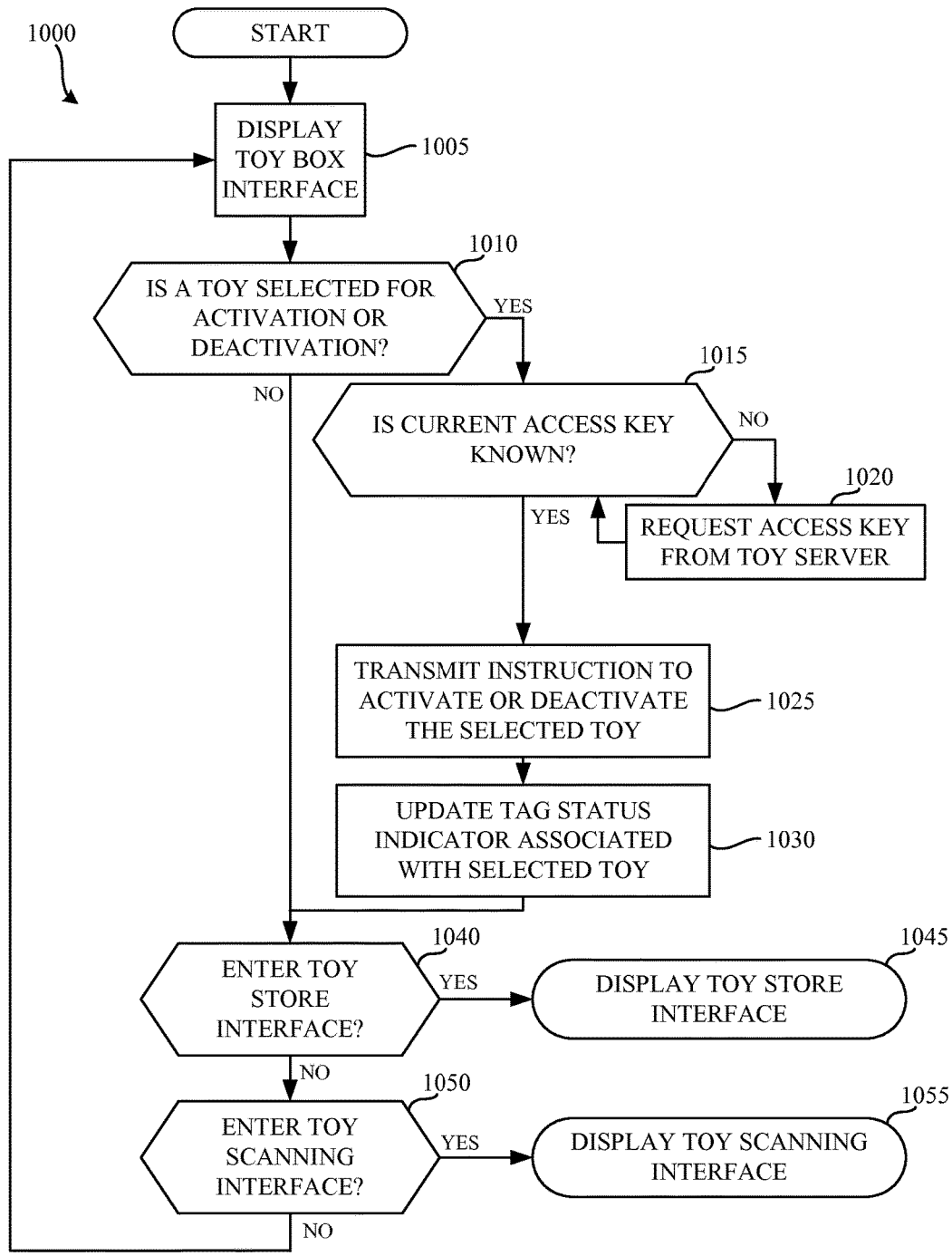
FIG. 10 is a flowchart representative of example machine-readable instructions which may be executed to implement the example toy manager of FIGS. 1 and/or 2 to enable selection of a toy for emulation.

FIG. 10 is a flowchart representative of example machine-readable instructions which may be executed to implement the example toy manager 175 of FIGS. 1 and/or 2 and to enable selection of a toy for emulation. The example program 1000 of FIG. 10 begins at block 1005 when the toy processor 270 displays a toy box interface (e.g., the toy box interface 510 of FIG. 5, the toy box interface 610 of FIG. 6, etc.) via the display 171 (block 1005). The toy processor 270 receives user input from the user input receiver 172 and navigates through the toy box interface. Based on the received user input, the example toy processor 270 determines whether a toy is selected for activation or deactivation (block 1010). The toy may be selected for activation when, for example, the toy is not being emulated, but the user desires to emulate the toy for use in a videogame. The toy may be selected for deactivation when, for example, the toy is being emulated, but the user would no longer like the toy to be emulated. In some examples, the NFC radio 187 emulates a single NFC tag at a time. As such, when a first toy is being emulated, and the user wishes to activate a second toy, the first tag associated with the first toy is de-activated before the second tag associated with the second toy baby activated.

If a toy is selected for activation or deactivation, the example toy processor 270 determines whether the current access key for accessing the tag processor 192 is known (block 1015). In some examples, the toy processor 270 determines whether the current access key is known by transmitting a dummy request to the tag processor 192 via the tag processor communicator 280. A response to the dummy request enables verification that valid access is granted by the tag processor 192. If the toy processor 270 determines that the current access key is not known (e.g., the dummy request fails to return a valid response, the dummy request is rejected), the example toy processor 270 requests the access key from the toy server 120 (block 1020). In some examples, the toy processor 270 transmits additional credential data to the toy server 120 when requesting the access key. Such additional credential data may enable the toy server 120 to confirm that the access key should be provided to the toy processor 270. In some examples, the credential data is a username and password of the user of the mobile communication device 170. However, the credential data may be any other type of data such as, for example, a certificate, a user identifier, etc. Control returns to block 1015 where the toy processor 270 determines whether the current access key is known.

When the current access key is known by the example toy processor 270, control proceeds to block 1025 where the tag processor communicator 280 transmits an instruction to activate or deactivate the selected toy (block 1025). Once the selected toy is activated or deactivated according to the transmitted instruction, the toy processor 270 updates the tag status indicator 240 (block 1030). The updated tag status indicator 240 thereby informs the user of which toy is being emulated by the NFC radio 187. The example toy processor 270 then proceeds to navigate through the toy box interface. In some examples, the user instructs the toy processor 270 that they wish be presented with a toy store interface (e.g., the toy store interface 710 of FIG. 7). The toy processor determines whether the user has requested navigation to the example toy store interface (block 1040) and, if so, displays the toy store interface via the display 171 (block 1045). In some examples, the user instructs the toy processor 270 that they wish to be presented with a scanning interface (e.g., the scanning interface 810 of FIG. 8). The example toy processor 270 determines whether the user has requested navigation to the example scanning interface (block 1050) and, if so, displays the scanning interface via the display 171 (block 1055). If the user has not indicated that they would like to navigate to either the toy store interface or the scanning interface, control returns to block 1005 were the toy processor 270 displays the toy box interface via the display 171.

Figure 11:
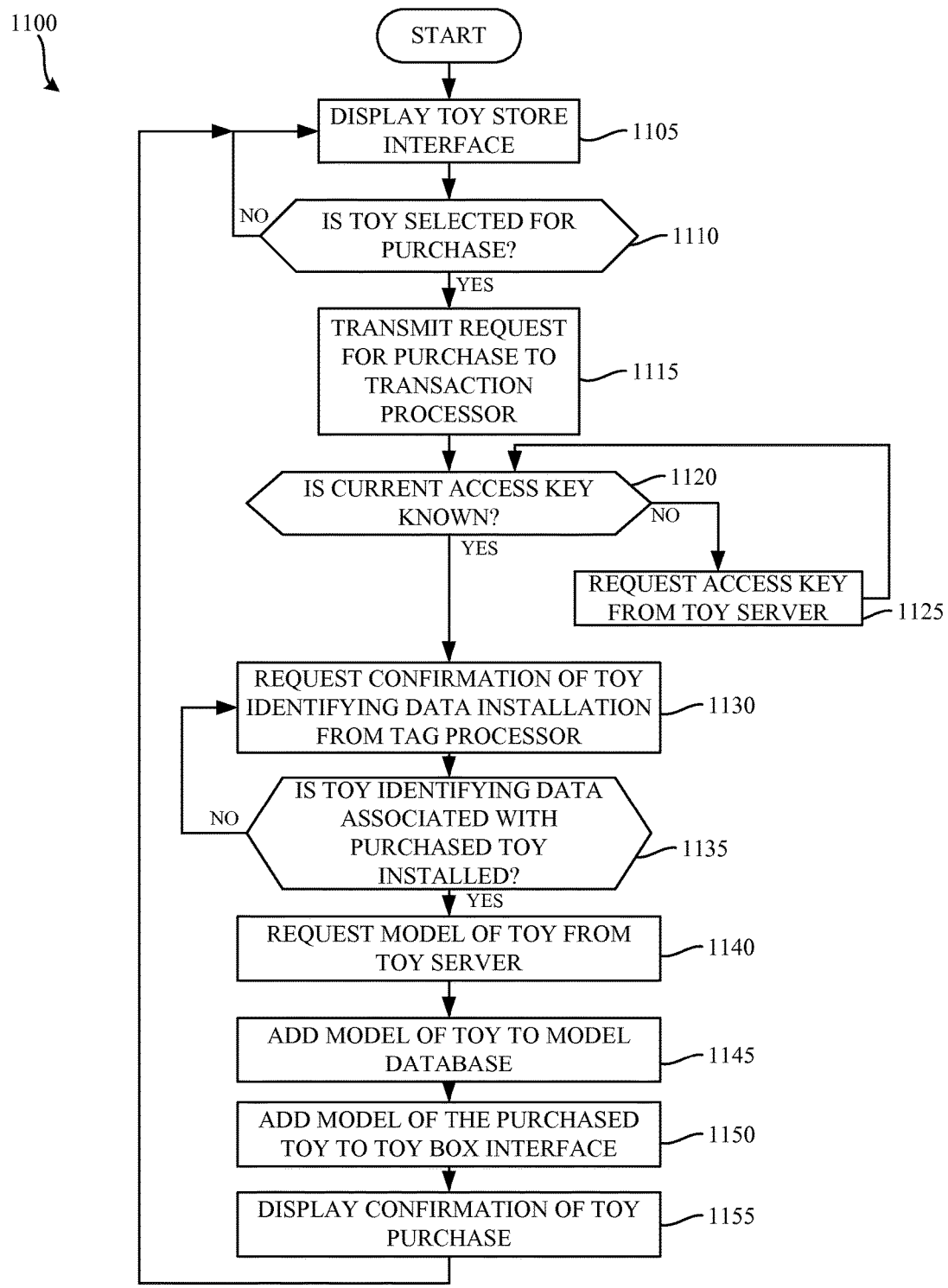
FIG. 11 is a flowchart representative of example machine-readable instructions which may be executed to implement the example toy manager of FIGS. 1 and/or 2 to purchase a toy.

FIG. 11 is a flowchart representative of example machine-readable instructions which may be executed to implement the example toy manager 175 of FIGS. 1 and/or 2, and/or to purchase a toy. The example program 1100 of the illustrated example of FIG. 11 begins when the example toy processor 270 displays the toy store interface (e.g., the example toy store interface 710 of FIG. 7) via the display 171 (block 1105). In the illustrated example, to display the toy store interface, the example toy processor 270 communicates with the transaction processor 130 of the example toy server 120 to gather toy store information. The toy store information represents toys that are for sale and sales information associated with those toys. In the illustrated example the toy store information also indicates which toys are already owned by the user to which the toy store interface is presented. As such, in some examples, the toy processor 270 communicates user identifying information to the transaction processor 130 to facilitate identification of which toys are already owned and/or associated with the user of the mobile communication device 170.

When displaying the example toy store interface, the toy processor 270 of the illustrated example receives user input from the user input receiver 172 to, for example, navigate through the toy store interface. The toy processor 270 of this example determines if a toy is selected for purchase (block 1110). If no toy is selected for purchase, control proceeds to block 1105. If a toy is selected for purchase (block 1110), the transaction requester 260 transmits a request for purchase to the transaction processor 130 of the example toy server 120 (block 1115). The transaction processor 130 processes the request for purchase of the toy and, if the purchase of the toy is successful, adds the tag associated with the purchase toy to the tag processor 192 via the tag proxy 290. The example toy processor 270 then determines whether the current access key for accessing the tag processor 192 is known (block 1120). In some examples, the toy processor 270 determines whether the current access key is known by transmitting a dummy request to the tag processor 192 via the tag processor communicator 280 using the access key currently known to the toy processor 270. A response to the dummy request enables verification of whether valid access is granted by the tag processor 192. If the toy processor 270 determines that the current access key is not known (e.g. the dummy request fails), the example toy processor 270 requests the access key from the toy server 120 (block 1125). In some examples, the toy processor 270 transmits additional credential data to the toy server 120 when requesting the access key. Such additional credential data may enable the toy server 120 to confirm that the access key should be provided to the toy processor 270. In some examples, the credential data is a username and password of the user of the mobile communication device 170. However, the credential data may be any other type of data such as, for example, a certificate, a user identifier, etc. Control returns to block 1120 where the toy processor 270 determines whether the current access key is known.

When the current access key is known by the toy processor 270 (block 1120), the toy processor 270 communicates with the tag processor 190 via the tag processor communicator 280 to request confirmation of the installation of the toy-identifying data associated with the purchased toy (block 1130). The toy processor 270 then determines whether the toy-identifying data associated with the purchased toy has been installed in the data store 194 (block 1135). If the toy-identifying data associated with the purchased toy is not installed, the example toy processor 270 again requests confirmation of the toy-identifying data installation (block 1130). Once a toy processor 270 confirms that the toy-identifying data associated with the purchased toy been installed in the data store 194 (block 1135), the toy processor 270 requests a model of the purchased toy from the toy server 120 (block 1140). The model is then provided by the model provider 130, and the toy processor 270 adds the model of the toy to the model database 250 (block 1145). The model presenter 230 then adds the model of the purchased toy to the toy box interface (block 1150). The user may then view the purchased toy displayed in the toy box interface and may, for example, select the toy for emulation by the NFC radio 187. The example toy processor 270 presents, via the display, a confirmation of the purchase of the toy (block 1155). Control then returns to block 1105, where the toy processor 270 presents the toy store interface via the display 171.

Figure 12:
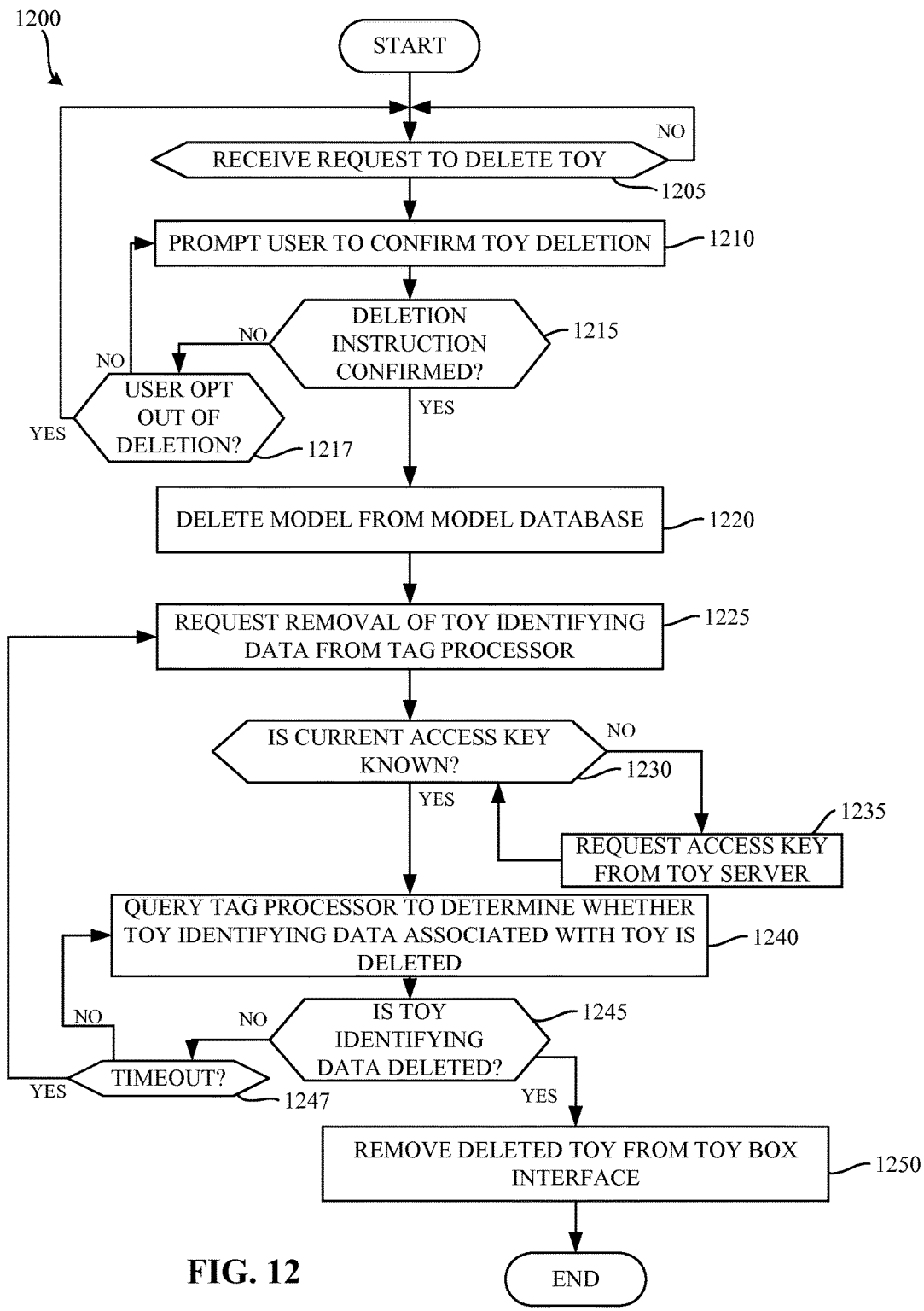
FIG. 12 is a flowchart representative of example machine-readable instructions which may be executed to implement the example toy manager of FIGS. 1 and/or 2 to delete a toy.

FIG. 12 is a flowchart representative of example machine-readable instructions which may be executed to implement the example toy manager 175 of FIGS. 1 and/or 2 and to delete a toy. The example program 1200 of the illustrated example of FIG. 12 begins at block 1205 when the example toy processor 270 determines whether a request to delete a toy has been received (block 1205). In the illustrated example, the toy processor 270 receives the request via the user input receiver 172. The request to delete the toy may be received because, for example, the user wishes to remove a toy that they no longer play with from the toy box interface, the user has given the toy to a friend, etc. The example toy processor 270 then prompts the user, via the display 171, to confirm the toy deletion (block 1210). The toy processor 270 then receives a response via the user input receiver 172, and determines whether the deletion instruction has been confirmed (block 1215). If the deletion instruction has not been confirmed, the toy processor 270 determines whether the user has opted out of deleting the toy (block 1217). If the user has not opted out of the deletion, the example toy processor 270 prompts the user, via the display 171, to confirm the toy deletion (block 1210). If the user confirms that they have opted out of deletion of the toy, control returns to block 1205, where the toy processor 270 determines whether a request to delete a toy has been received (block 1205). If the deletion instruction is confirmed (block 1215), the example toy processor 270 deletes the model associated with the deleted toy from the model database 250 (block 1220). The toy processor 270 then requests, via the tag processor communicator 280, removal of the toy-identifying data associated with the deleted toy from the tag processor 192 (block 1225). In some examples, deleting a toy from the toy processor 192 is an activity that does not require an access key to be known. In some examples, instead of transmitting the request directly from the toy processor 270 to the tag processor 192, the request to delete the tag may be transmitted to the toy server 120. In such examples, the toy server 120 may then request that the tag be deleted by the tag processor 192.

In the illustrated example, the example toy processor 270 determines whether the current access key for accessing the tag processor 192 is known (block 1230). In some examples, the toy processor 270 determines whether the current access key is known by transmitting a dummy request to the tag processor 192 via the tag processor communicator 280 using the access key currently known to the toy processor 270. A response to the dummy request enables verification that valid access is granted by the tag processor 192. If the toy processor 270 determines that the current access key is not known (e.g., the dummy request fails to return a valid response, the dummy request is rejected), the example toy processor 270 requests the access key from the toy server 120 (block 1235). In some examples, the toy processor 270 transmits additional credential data to the toy server 120 when requesting the access key. Such additional credential data may enable the toy server 120 to confirm that the access key should be provided to the toy processor 270. In some examples, the credential data is a username and password of the user of the mobile communication device 170. However, the credential data may be any other type of data such as, for example, a certificate, a user identifier, etc. Control returns to block 1230 where the toy processor 270 determines whether the current access key is known.

In the illustrated example, the toy processor 270 queries the tag processor 192, via the tag processor communicator 280, to determine whether the toy-identifying data associated with the toy has been deleted (block 1240). If the tag has not yet been deleted (block 1245), the example toy processor 270 determines whether a deletion timeout has occurred (block 1247). If the deletion timeout has not occurred, the toy processor 270 queries the tag processor 192 (block 1240). If the deletion timeout has occurred, the toy processor 270 requests removal of the toy-identifying data from the tag processor (block 1225). When the toy-identifying data has been deleted (block 1245), the example toy processor removes the deleted toy from the toy box interface (block 1250).

Figure 13:
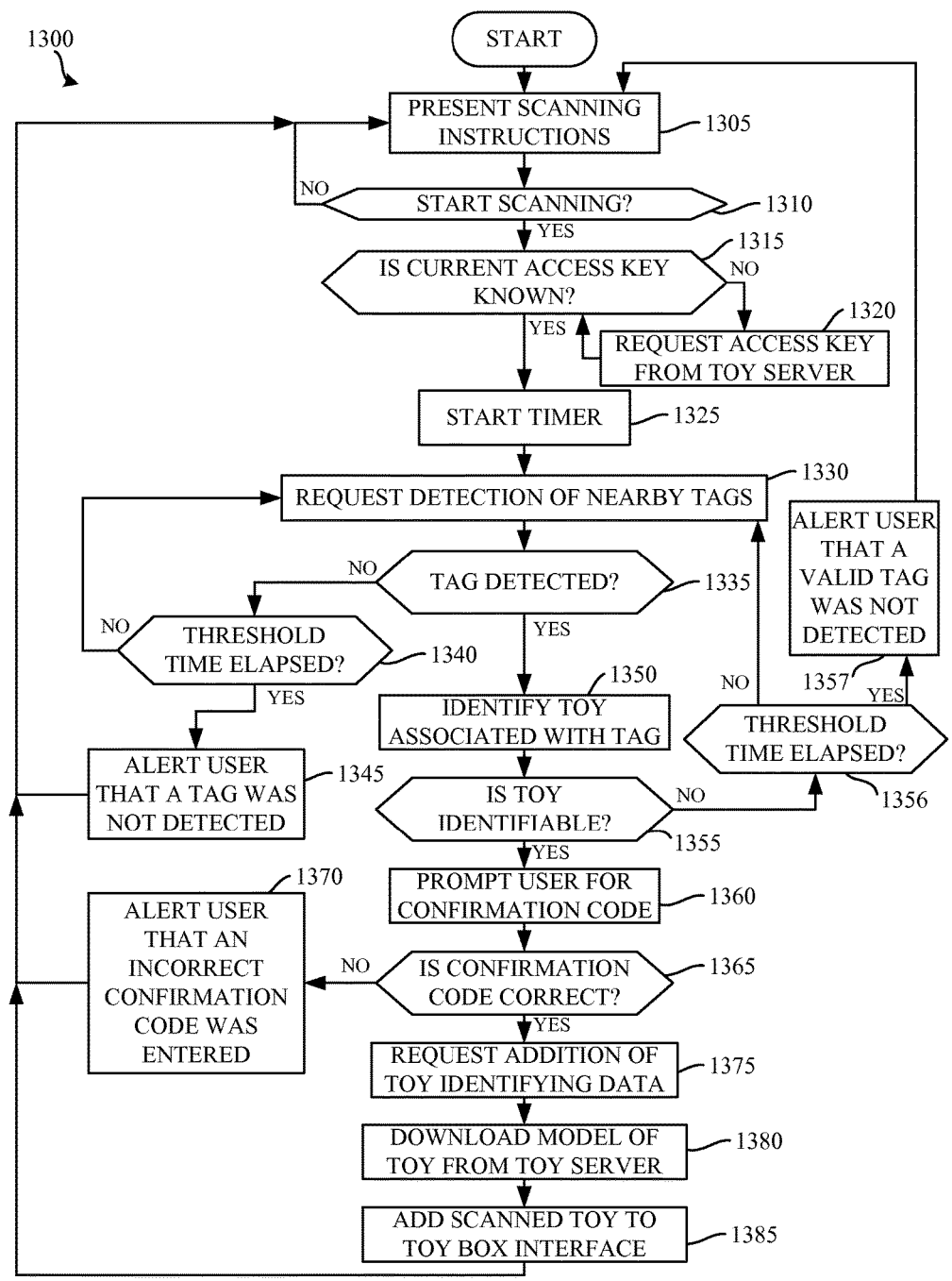
FIG. 13 is a flowchart representative of example machine-readable instructions which may be executed to implement the example toy manager of FIGS. 1 and/or 2 to scan for a physical toy for emulation.

FIG. 13 is a flowchart representative of example machine-readable instructions which may be executed to implement the example toy manager 175 of FIGS. 1 and/or 2, and/or to scan for a physical toy for emulation. The example program 1300 of FIG. 13 begins at block 1305 were the toy processor 270 present scanning instructions via the display 171 (block 1305). In the illustrated example, the user may be instructed to tap the mobile communication device 170 to the toy to be scanned. Example scanning instructions are shown in block 815 of FIG. 8. The example toy processor 270 determines whether scanning should begin (block 1310). In some examples, the user must first provide an input via the user input receiver 172 to indicate that they are ready to begin scanning. If scanning is not to begin (block 1310), control returns to block 1305, where the toy processor continues to present scanning instructions. If scanning is to begin, the example toy processor 270 determines whether the current access key for accessing the tag processor 192 is known (block 1315). In some examples, the toy processor 270 determines whether the current access key is known by transmitting a dummy request to the tag processor 192 via the tag processor communicator 280 using the access key currently known to the toy processor 270. A response to the dummy request enables verification that valid access is granted by the tag processor 192. If the toy processor 270 determines that the current access key is not known (e.g. the dummy request fails to return a valid response, the dummy request is rejected), the example toy processor 270 requests the access key from the toy server 120 (block 1320). In some examples, the toy processor 270 transmits additional credential data to the toy server 120 when requesting the access key. Such additional credential data may enable the toy server 120 to confirm that the access key should be provided to the toy processor 270. In some examples, the credential data is a username and password of the user of the mobile communication device 170. However, the credential data may be any other type of data such as, for example, a certificate, a user identifier, etc. Control returns to block 1315 where the toy processor 270 determines whether the current access key is known.

When the access key is known (block 1315), the example toy processor 270 initializes a timer (block 1325). In the illustrated example, the timer enables the toy processor 270 to stop scanning after a threshold period of time has elapsed. In some examples, scanning consumes additional battery power of the mobile communication device 170. As such, long periods of continuous scanning may be undesirable. The tag processor communicator 280 requests detection of nearby tags (block 1330). The NFC controller 330 of the example tag processor 192 enters a scanning mode and reports identified tags. The tag processor communicator 280 then determines if the tag is been detected by the NFC controller 330 (block 1335). If a tag has not been detected (block 1335), the toy processor 270 compares the timer to a threshold time to determine whether the threshold time has elapsed (block 1340). If the threshold time has elapsed, the toy processor 270 alerts the user, via the display 171, that a tag is not detected (block 1345). Control then returns to block 1305 where the toy processor 270 displays a scanning instruction via the display 171 (block 1305). If the threshold time has not elapsed, the tag processor communicator 280 continues to request detection of nearby tags (block 1330).

If a tag has been detected, the example toy processor 270 attempts to identify a toy associated with the identified tag (block 1350). In the illustrated example, the toy processor 270 identifies the toy by transmitting the tag data to the transaction processor 130 of the example toy server 120. In some examples, an NFC tag may be scanned that is not associated with a toy. For example, instead of scanning a toy, the user may scan an access key card (e.g. an access key card that may be used to enter a workplace, etc.). If a toy associated with the scanned tag is not identifiable (block 1355), control proceeds to block 1330 where the tag processor communicator 280 compares the timer to a threshold time to determine whether the threshold time has elapsed (block 1356). If the threshold time has not yet elapsed, the toy processor continues to request detection of a nearby tag (block 1330). If the threshold time has elapsed, the toy processor 270 alerts the user that a valid tag was not detected (block 1357). Control then returns to block 1305 where the toy processor 270 presents scanning instructions.

If the toy is identifiable (block 1355), the toy processor 270 prompts the user for a confirmation code associated with the toy (block 1360). In some examples confirmation codes may be printed on the bottom of the toy to, for example, obscure the confirmation code while the toy is still within its retail packaging. Obscuring the confirmation code while the toy is in its retail packaging prevents users from scanning toys that are on a shelf in the toy store. In the illustrated example, the confirmation code is a short string of characters (e.g., five characters). However, the confirmation code may be implemented in any other fashion such as, for example a quick response (QR) code that may be scanned by an image capturing device of the mobile communication device 170, a barcode, etc. In some examples, the confirmation code may be displayed on a separate mobile communication device that is emulating the tag that was scanned (e.g., to transfer a toy from a first mobile communication device to a second mobile communication device). The example toy processor 270 determines whether the confirmation code is correct (block 1365).

In the illustrated example, the toy processor 270 communicates with the transaction processor 130 to determine whether the confirmation code is correct. Valid confirmation codes may be stored in association with the tag data in the toy data database 160 of the example toy server 120 of FIG. 1. In some examples, the toy server 120 may prevent a toy from being emulated by multiple mobile communication devices. For example, the confirmation code may only be accepted one time. Alternatively, the toy server 120 may store records of when a confirmation code was accepted, and whether the toy associated with the confirmation code is already associated with a different user. In some examples, the toy must be disassociated with the different user before it can be associated with a new user. If the confirmation code is incorrect, the example toy processor 270 alerts the user, via the display 171, that an incorrect confirmation code was entered (block 1370). Control returns to block 1305, where the example toy processor 270 presents scanning instructions via the display 171 (block 1305). If the confirmation code is correct (block 1365), the toy processor requests addition of the toy-identifying data to the tag processor 192 (block 1375). The toy processor 270 then downloads a model of the toy from the toy server 120 (block 1380). The scanned toy is then added to the toy box interface by the model presenter 230 (block 1385).

In some examples, users may wish to give a toy to a friend, in a similar fashion to how they would give a physical toy to a different user. In such an example, the first user may emulate, via a first mobile communication device, the toy to be transferred. The second user enters the scanning mode on the second mobile communication device (e.g., the scanning of described in association with FIG. 13) and scans the toy emulated by the first mobile communication device (block 1310). However, just because the toy has been scanned (blocks 1350 and 1355) does not mean that the scanned toy can now be emulated by the second mobile communication device. Instead, a confirmation code must be entered (block 1365). To this end, a confirmation code may be displayed on the first mobile communication device. Once a confirmation code is entered on the second mobile communication device, the toy may be activated for emulation. In the illustrated example, the confirmation code is provided, via the first mobile communication device, to the second user for entry of the second mobile communication device. In some examples, the confirmation code may only be provided once the toy on the first mobile communication device has been deleted. In some examples, once the confirmation code has been validated and the toy has been installed on the second mobile communication device, the toy server 120 may delete the toy from the first mobile communication device. In some examples, providing the confirmation code automatically deletes the toy from the first mobile communication device. Accordingly, this prevents users from duplicating toys which would otherwise be purchased. In some examples, rather than emulating and scanning a toy to be transferred, an instruction may be provided to a first mobile communication device to transmit the toy to a second mobile communication device. A toy processor of the first mobile communication device may instruct the transaction processor 130 that the toy is to be transferred from a first user (e.g., a user associated with the first mobile communication device) to a second user (e.g., a user associated with the second mobile communication device). The transaction processor 130 may then facilitate transfer of the tag data from the first mobile communication device to the second mobile communication device and deletion of the toy from an account associated with the first user.

Figure 14:
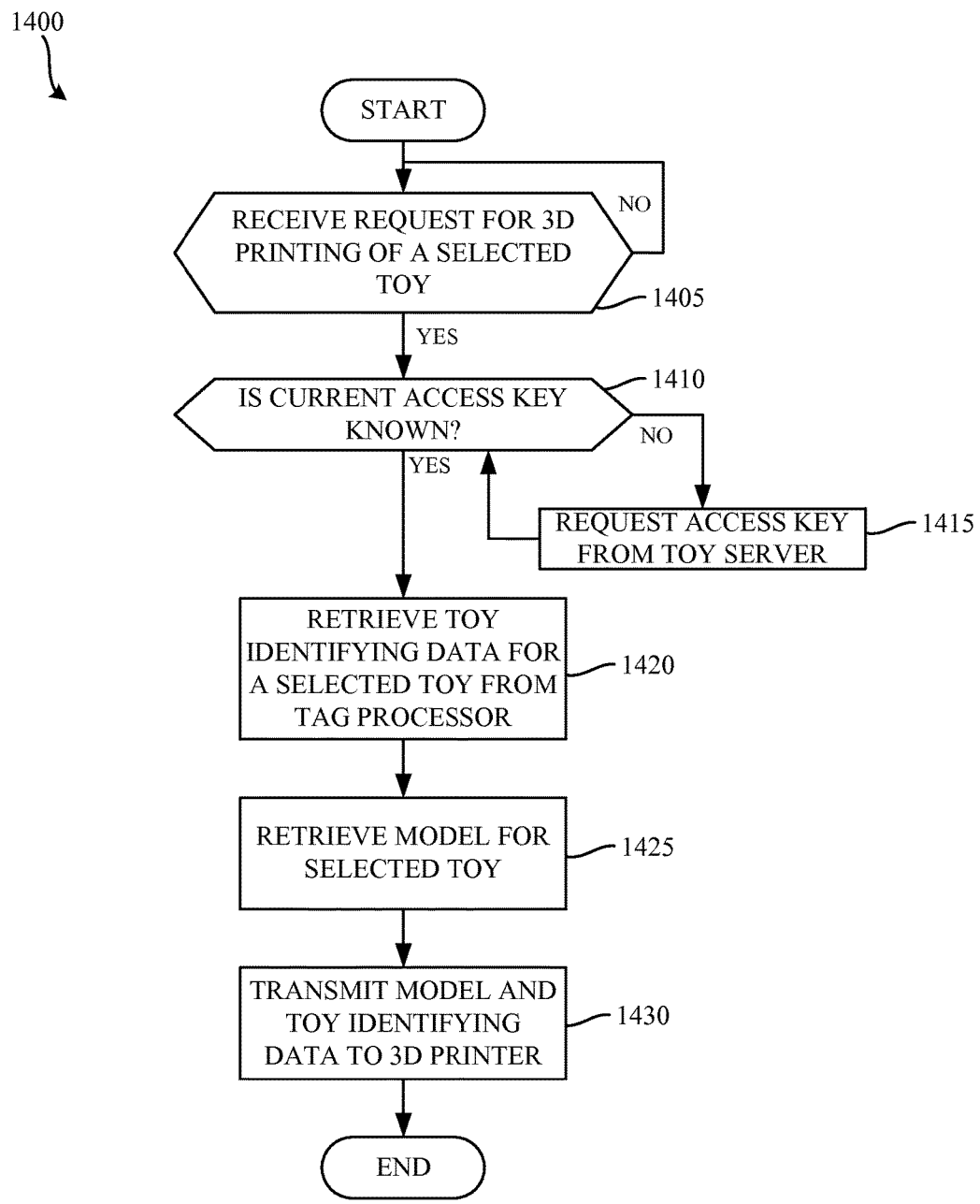
FIG. 14 is a flowchart representative of example machine-readable instructions which may be executed to implement the example toy manager of FIGS. 1 and/or 2 to request a virtual toy be printed in physical form.

FIG. 14 is a flowchart representative of example machine-readable instructions which may be executed to implement the example toy manager 175 of FIGS. 1 and/or 2, and/or to request a virtual toy be printed in physical form. The example program 1400 of the illustrated example of FIG. 14 begins at block 1405 when the toy processor 270 determines whether a request for 3D printing of a selected toy has been received (block 1405). The example toy processor 270 determines whether the current access key for accessing the tag processor 192 is known (block 1410). In some examples, the toy processor 270 determines whether the current access key is known by transmitting a dummy request to the tag processor 192 via the tag processor communicator 280 using the access key currently known to the toy processor 270. A response to the dummy request enables verification that valid access is granted by the tag processor 192. If the toy processor 270 determines that the current access key is not known (e.g., the dummy request fails to return a valid response, the dummy request is rejected), the example toy processor 270 requests the access key from the toy server 120 (block 1415). In some examples, the toy processor 270 transmits additional credential data to the toy server 120 when requesting the access key. Such additional credential data may enable the toy server 120 to confirm that the access key should be provided to the toy processor 270. In some examples, the credential data is a username and password of the user of the mobile communication device 170. However, the credential data may be any other type of data such as, for example, a certificate, a user identifier, etc. Control returns to block 1410 where the toy processor 270 determines whether the current access key is known.

The tag processor communicator 280 of the illustrated example retrieves the toy-identifying data for the selected toy from the tag processor 192 (block 1420). In the illustrated example, the toy-identifying data is provided to the tag processor communicator 280 in an encrypted format from the tag processor 192. Providing the toy-identifying data in an encrypted format prevents the toy-identifying data from being exposed, and reduces the likelihood that tags may be emulated in an unauthorized fashion. The toy processor 270 then retrieves the model for the selected toy (block 1425). In the illustrated example, the example toy processor 270 retrieves the model from the model database 250. However, in some examples the toy processor 270 retrieves the model from the toy server 120. In some examples, the model may be modified by the toy processor 270 to, for example, add a feature to the model, indicate that the model was printed using the 3D printer 197 (e.g. the model is not an original model produced by the toy manufacturer 105), etc. The example toy processor 270 transmits the model and the toy-identifying data to the 3D printer 197 (block 1430). In the illustrated example, the toy-identifying data is transmitted in the encrypted format, and is decrypted by the 3D printer 197.

Figure 15:
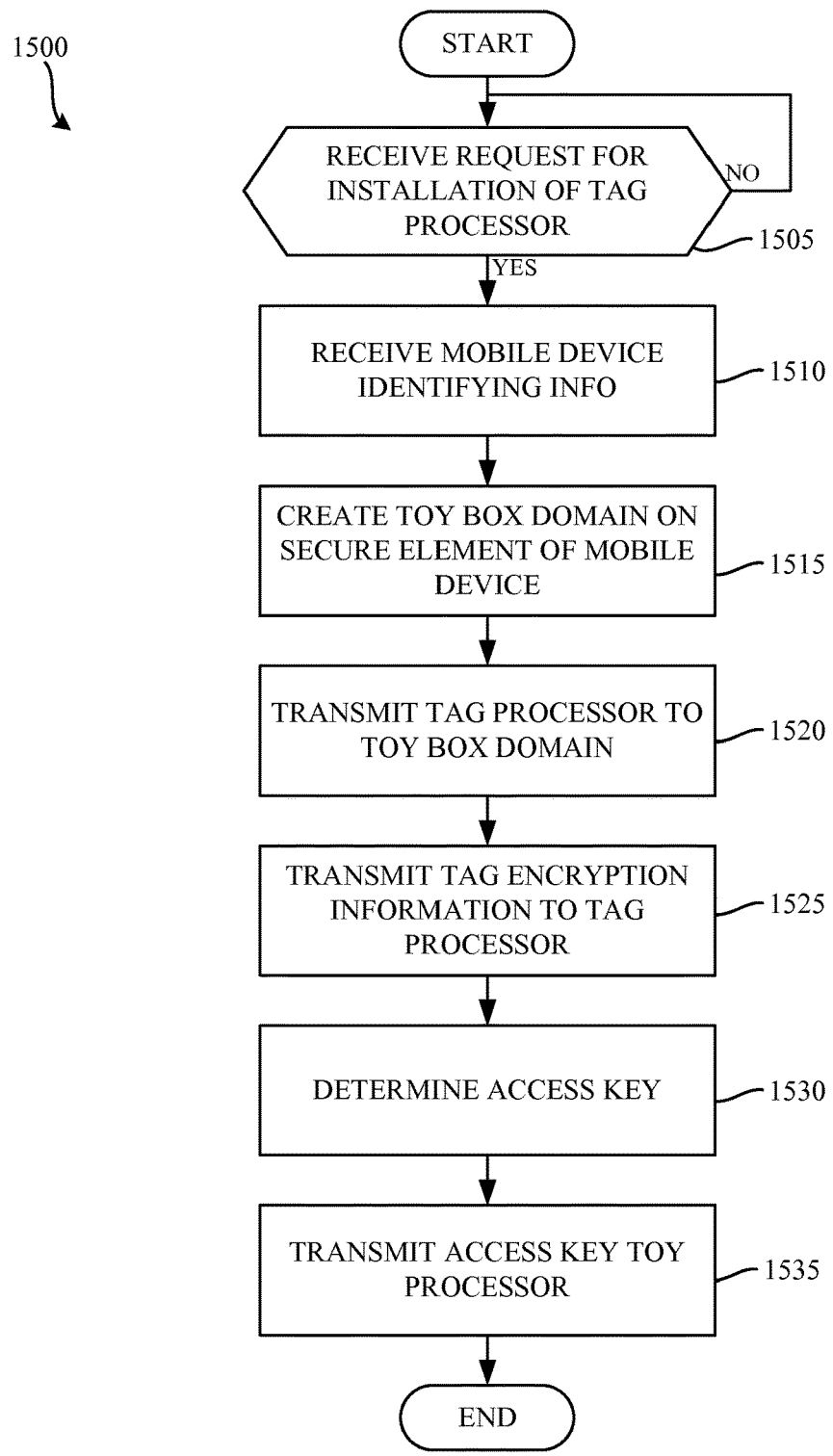
FIG. 15 is a flowchart representative of example machine-readable instructions which may be executed to implement the example toy server of FIG. 1 to initialize the example tag processor of FIGS. 1 and/or 3.

FIG. 15 is a flowchart representative of example machine-readable instructions which may be executed to implement the example toy server 120 of FIG. 1 and/or to initialize the example tag processor of FIGS. 1 and/or 3. The example program 1500 of the illustrated example of FIG. 15 begins at block 1505 where the secure element controller 135 determines whether a request for the installation of the tag processor 192 has been received (block 1505). If no request has been received, the example secure element controller 135 waits until a request is received (block 1505). In the illustrated example, the request to install the tag processor 192 is received upon the first launch of the toy manager 175. However, the request may be received at any other time such as, for example, a time of manufacturing of the mobile communication device 170, a time of sale of the mobile communication device 170, etc. The secure element controller 135 then receives mobile communication device identifying information (block 1510). The mobile communication device identifying information enables the toy server 120 to manage an account for the mobile communication device 170. The account may be used to, for example, keep a record of what toys are owned by the user of the mobile communication device, store transaction processing information (e.g., purchase history for the mobile communication device, credit card information, etc.). The example secure element controller 135 creates the toy box domain 190 within the secure element 185 of the mobile communication device 170 (block 1515).

As disclosed above, the toy box domain 190 provides a secure location for tag data to be stored on the mobile communication device 170. Once the toy box domain 190 is created, the secure element controller 135 transmits the tag processor 192 to the toy box domain 190 of the secure element 185 (block 1520). The secure element controller then transmits tag encryption information to the tag processor 192 (block 1525). The tag encryption information enables the tag processor 192 to store tag data in an encrypted format, such that it may not be accessed by entities other than the tag processor 192. In the illustrated example, the tag encryption information is an encryption key. However, any other type of tag encryption information may additionally or alternatively be used such as, for example, a location (e.g., a universal resource locator (URL)) where the encryption key may be retrieved. The access key controller 140 then determines an access key that is to be verified by the tag processor 192 when the toy manager 175 requests access (block 1530). Using an access key prevents another application executing on the mobile communication device 170 from accessing the tag processor 192. Moreover, the access key may be modified and/or changed over time such that the toy server 120 can control whether access is granted to the tag processor 192. In the illustrated example, the access key is a hexadecimal string of characters. However, the access key may be implemented using any other format, such as, for example, binary data, text data, etc. The access key controller 140 then transmits the access key to the toy processor 270 of the toy manager 175 (block 1535). Providing the access key to the toy processor 270 ensures that the toy processor 270 will be able to interact with the tag processor 192.

Figure 16:
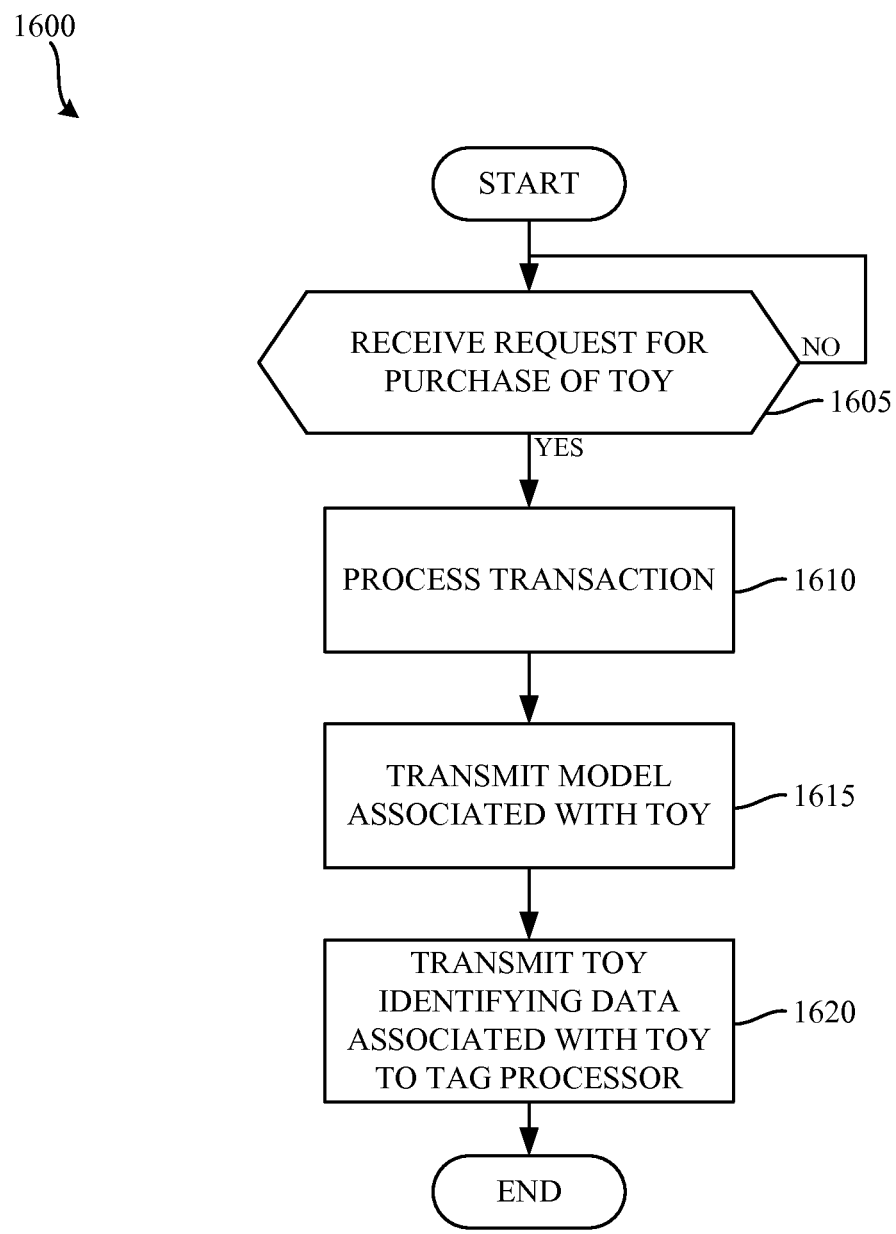
FIG. 16 is a flowchart representative of example machine-readable instructions which may be executed to implement the example toy server of FIG. 1 to facilitate purchase of a toy.

FIG. 16 is a flowchart representative of example machine-readable instructions which may be executed to implement the example toy server 120 of FIG. 1 and/or to facilitate purchase of a toy. The example program 1600 of the illustrated example of FIG. 16 begins at block 1605 where the transaction processor 130 determines whether a request for purchase of a toy has been received via the communicator 155 (block 1605). If no request has been received, the example transaction processor 130 waits until a request is received (block 1605). In the illustrated example, the request is received in response to the user clicking a purchase button displayed via a toy store interface presented via the mobile communication device 170. However, the request may be received in response to any other activity such as, for example, a user purchasing a toy via a website, etc. The transaction processor 130 processes the transaction (block 1610). In the illustrated example, the request for purchase received includes funding information such as, for example, a credit card number. In the illustrated example, the transaction processor 130 interacts with a credit card processor to process the transaction. However, the transaction may be processed in any other fashion. For example, the user may have a balance of credit with the transaction processor, may enter a gift card number, etc. Once the transaction has been processed, the model provider 150 transmits a model associated with the purchased toy via the communicator 155 (block 1615). In the illustrated example, the model is a three dimensional representation of the toy. However, any other type of model and/or representation of the purchase toy may additionally or alternatively be used such as, for example, an image of the toy. The example tag provider 145 transmits toy-identifying data associated with the purchase toy to the tag processor 192 (block 1620). In the illustrated example, the tag provider 145 transmits the data to the tag processor 192 via the tag proxy 290. However, the tag data may be transmitted to the tag processor 192 in any other fashion such as, for example, by remotely administering the secure element 185 to supply the toy-identifying data without transmitting the tag data via the toy manager 175.

Figure 17:
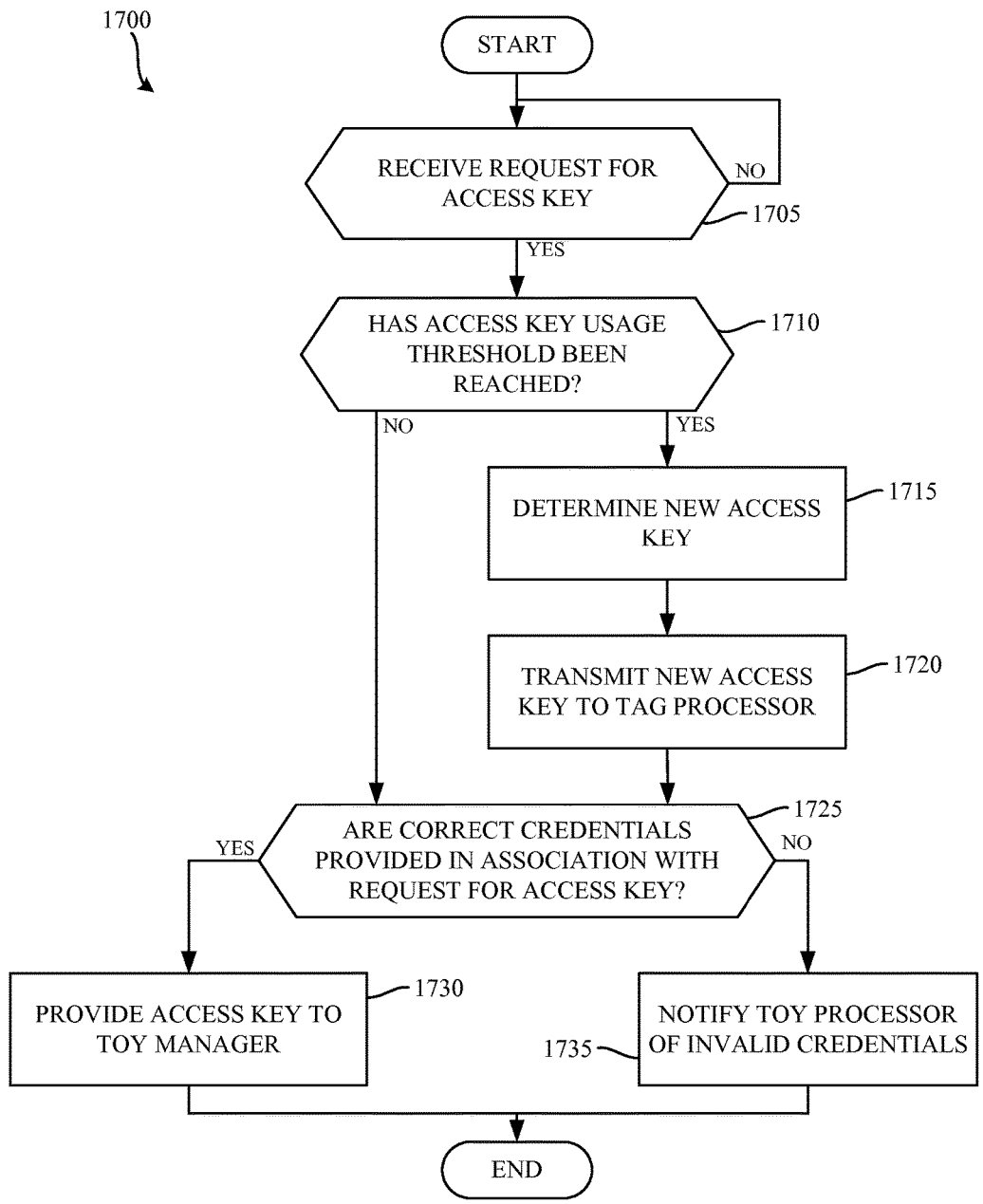
FIG. 17 is a flowchart representative of example machine-readable instructions which may be executed to implement the example toy server of FIG. 1 to handle a request for an access key from the example toy manager of FIGS. 1 and/or 2.

FIG. 17 is a flowchart representative of example machine-readable instructions which may be executed to implement the example toy server 120 of FIG. 1 and/or to handle a request for an access key from the example toy manager 175 of FIGS. 1 and/or 2. The example program 1700 of the illustrated example of FIG. 17 begins at block 1705 when the access key controller 140 determines whether a request for an access key has been received via the communicator 155 (block 1705). If no request has been received, the example access key controller waits until the request is received (block 1705). In the illustrated example, the request for the access key is transmitted by the toy processor 270 when attempting to access the tag processor 192. The access key controller 140 determines whether an access key usage threshold has been reached (block 1710). In the illustrated example, the access key usage threshold is a time threshold. For example, the access key usage threshold may be reached after a duration of time has elapsed such as, for example, one day, one week, one hour, etc. However, any other access key usage threshold may additionally or alternatively be used such as, for example, a number of times that the access key has been requested. Determining whether an access key usage threshold has been reached enables the access key controller 140 to control whether the toy manager 175 can interact with the tag processor 192 of the secure element 185. If the access key usage threshold has been reached (block 1710), the access key controller 140 determines a new access key to be used when accessing the tag processor 192 (block 1715). The access key controller 140 transmits the new access key to the tag processor 192 via the communicator 155 (block 1720). In the illustrated example, the access key is transmitted to the tag processor using an OTA communication protocol and does not pass through the tag proxy 290. However, in some examples, the access key controller 140 communicates the access key to the tag processor 192 via the tag proxy 290.

When the access key controller 140 has either determined that the access key threshold has not been reached (block 1710) or has transmitted a new access key to the tag processor 192 (block 1720), the access key controller 140 determines whether correct credentials have been provided in association with the request for the access key (block 1725). Ensuring the correct credentials have been provided in the request ensures that the access key is not provided to applications that are not authenticated. In the illustrated example, the credentials are a username and a password. However, any other type(s) of credentials may additionally or alternatively be used such as, for example, a certificate, a hardware identifier, etc. If correct credentials have been provided in association with a request for the access key (block 1725), the access key controller provides the access key to the toy processor 270 of the toy manager 175 (block 1730). Accordingly, using the provided access key, the toy processor 270 of the toy manager 175 can communicate with and/or otherwise access the tag processor 192. If correct credentials have not been provided in association with a request for the access key (block 1725), the access key controller notifies the requesting toy processor 270 of the invalid credentials (block 1735). Notifying the toy processor of the invalid credentials enables a user to, for example, re-enter their username and password.

Figure 18:
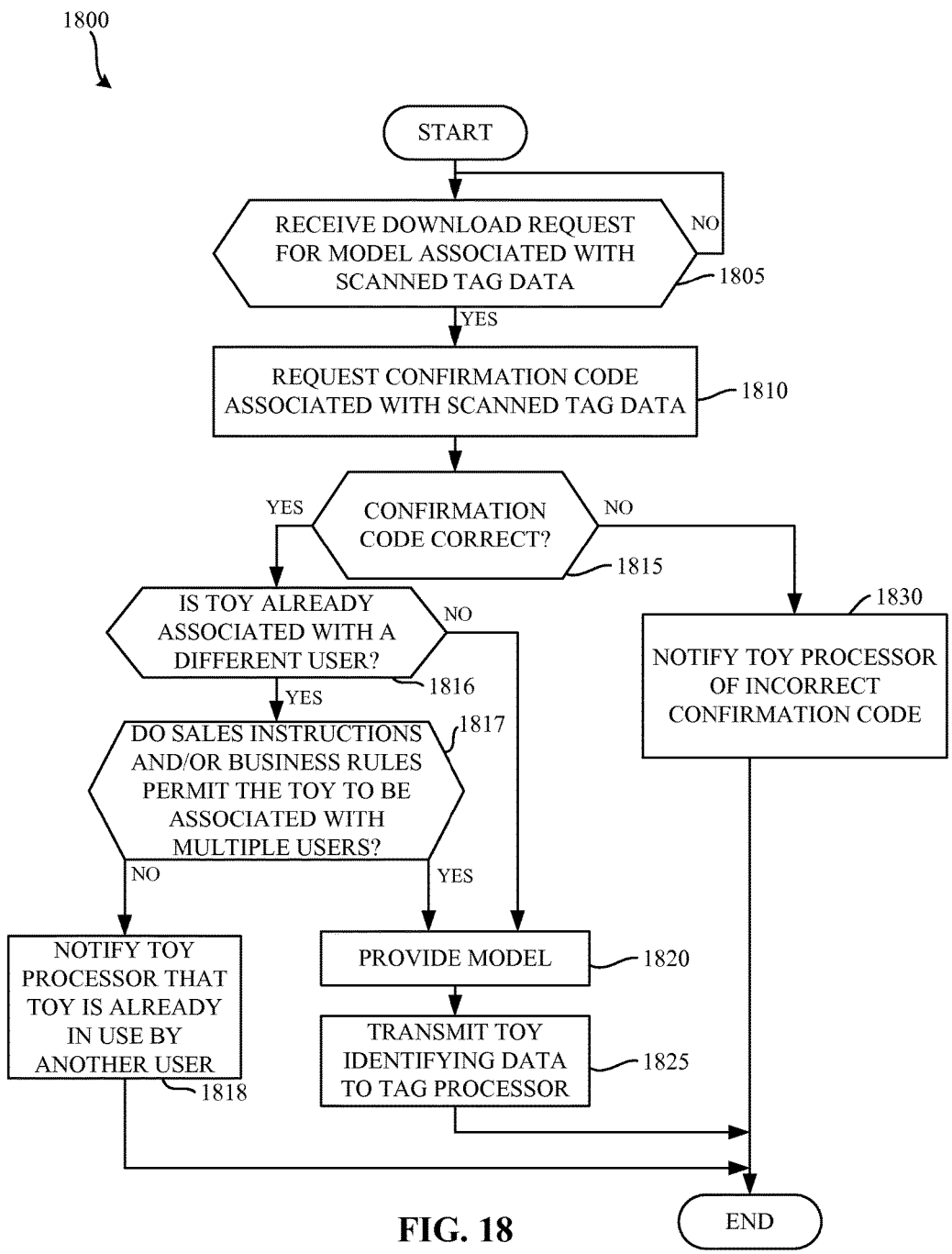
FIG. 18 is a flowchart representative of example machine-readable instructions which may be executed to implement the example toy server of FIG. 1 to facilitate scanning of a physical toy.

FIG. 18 is a flowchart representative of example machine-readable instructions which may be executed to implement the example toy server 120 of FIG. 1 and/or to facilitate scanning of a physical toy. The example program 1800 of the illustrated example of FIG. 18 begins at block 1805 when the transaction processor 130 determines whether a download request for model data associated with the scanned tag has been received (block 1805). If the download request has not been received, the transaction processor 130 waits until the download request is received (block 1805). The transaction processor requests a confirmation code associated with the scanned tag data and/or toy-identifying data (block 1810). If the confirmation code is correct (block 1815), the transaction processor 130 determines whether the tag data is already associated with a different user (block 1816). If the toy is not already associated with a different user, the model provider 150 provides the model to the requesting toy processor via the communicator 155 (block 1820). The tag provider 145 transmits tag data to the tag processor 270 via the communicator 155 (block 1825).

Returning to block 1816, if the toy is already associated with a different user (block 1816), the transaction processor 130 determines whether sales instructions and/or other business rules permit the toy to be associated with multiple users (block 1817). According to sales instructions and/or other business rules received from the toy manufacturer 105, the transaction processor 130 may only allow a limited number of virtual toys using the same tag data to be installed on mobile communication devices. For example, the toy manufacturer 105 may specify that for every physical toy, only one virtual toy may exist. Alternatively, the toy manufacturer may, in some examples, not restrict the number of virtual toys that may be stored in mobile communication devices based on a physical toy. If the sales instructions and/or other business rules permit the toy to be associated with multiple users (block 1817), the model provider 150 provides the model to the requesting toy processor via the communicator 155 (block 1820). If the sales instructions and/or other business rules do not permit the toy to be associated with multiple users (block 1817), the transaction processor 130 notifies the toy processor that the toy is already in use by a different user (block 1818). In some examples, the transaction processor 130 contacts the different user to confirm whether the toy should be transferred to the user providing the confirmation code.

If an incorrect confirmation code is has been supplied (block 1815), the transaction processor 130 notifies the toy processor 270 of the incorrect confirmation code (block 1830). Using a confirmation code before providing model and/or tag data to the toy processor 270 enables validation that toys scanned by the NFC radio 187 are actually owned by the user of the mobile communication device 170. In some examples, the user may attempt to scan a physical toy that is still contained within its retail packaging. While in the packaging, the confirmation code is not visible. As such, the user would be left to guessing the confirmation code if the retail packaging were not opened.

In some examples, the request for the confirmation code (block 1810) is delayed. For example, the transaction processor 130 may approve the transaction, and later request the confirmation code from the mobile communication device (e.g., request the confirmation code one day later, one week later, etc.). Delaying the request for the confirmation code enables users to scan a physical toy in a retail store, and emulate that toy for use in a videogame for a trial period. At the end of the trial period, the transaction processor 130 may request the confirmation code and/or request financial information (e.g., a credit card number) so that the user may purchase the virtual toy. In some examples, if, after the end of the trial, a correct confirmation code is not supplied, the transaction processor 130 may cause the tag associated with the toy to be deleted from the mobile communication device 170.

Figure 19:
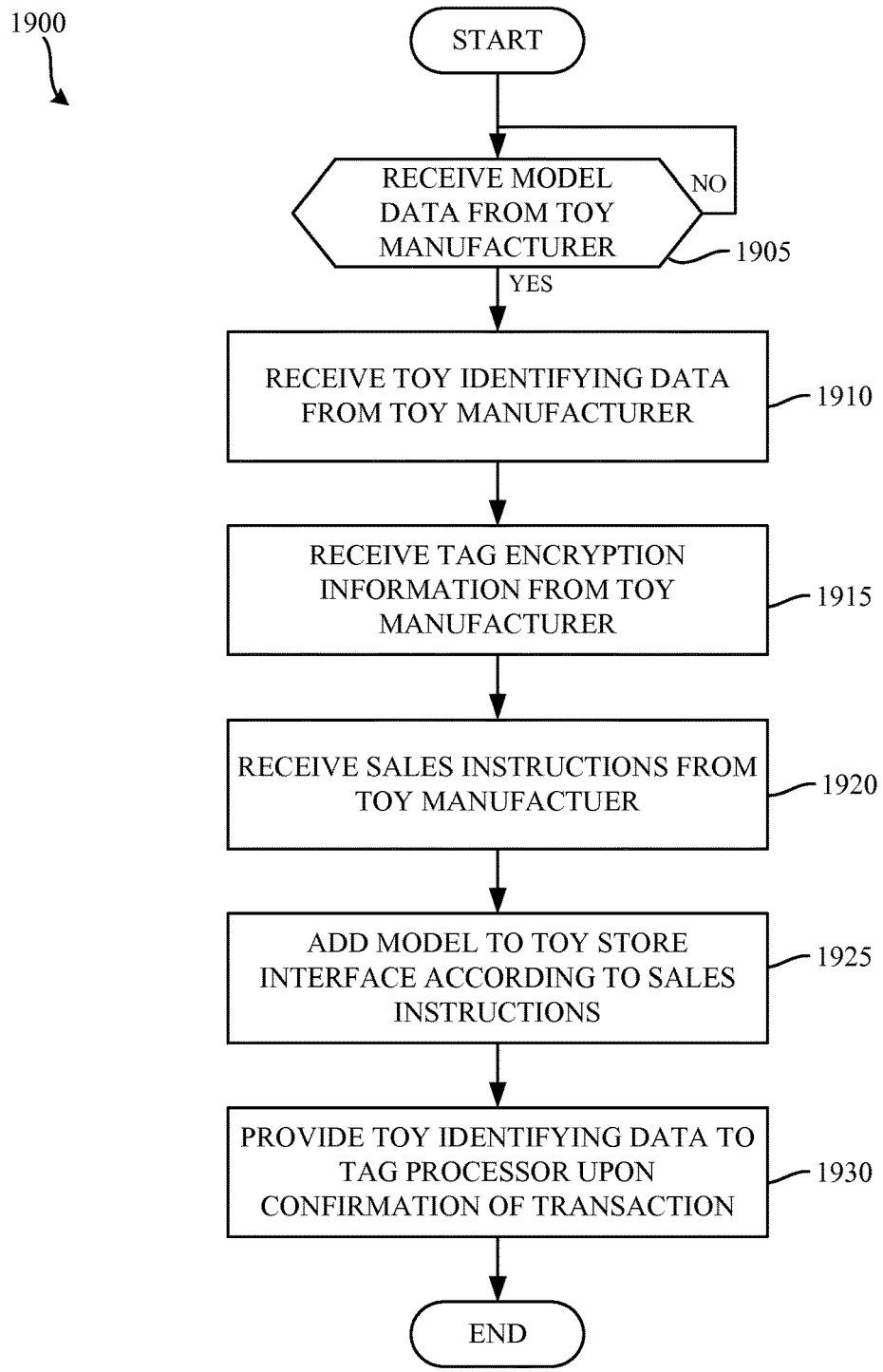
FIG. 19 is a flowchart representative of example machine-readable instructions which may be executed to implement the example toy server of FIG. 1 to receive toys for emulation from the example toy manufacturer of FIG. 1.

FIG. 19 is a flowchart representative of example machine-readable instructions which may be executed to implement the example toy server 120 of FIG. 1 and/or to receive toys for emulation from the example toy manufacturer 105 of FIG. 1. The example program 1900 of the illustrated example of FIG. 19 begins at block 1905 when the toy data receiver 125 determines whether model data from the toy manufacturer 105 has been received (block 1905). If no model data has been received, the example toy data receiver 125 waits until model data is received (block 1905). In the illustrated example, the model data is a three dimensional model of the toy that may be displayed in the toy box interface, the toy store interface, etc. In some examples, the model data is a three dimensional model that may be used for printing the toy in physical form on a 3D printer. In some examples, the model data is a two dimensional image of the toy. The toy data receiver 125 receives toy-identifying data from the toy manufacturer 105 (block 1910). In the illustrated example, the toy-identifying data, when emulated by the NFC radio 187, and read by the tag reader 112, causes a videogame to display a representation of the toy. The example toy data receiver 125 receives tag encryption information from the toy manufacturer 105 (block 1915). In the illustrated example, the tag encryption information is used to encrypt toy-identifying data that is stored on the secure element 187. When stored on the mobile communication device, tag data is stored in an encrypted format. As such, when the toy processor 270 retrieves toy-identifying data from the tag processor 192, actual toy-identifying data is not exposed. In some examples, the tag encryption information is provided to the 3D printer 197. The 3D printer 197 when receiving toy-identifying data may decrypt the toy-identifying data so that it may be written to the toy.

The toy data receiver 125 then receives sales instructions and/or other business rules from the toy manufacturer 105 (block 1920). The sales instructions instruct the toy server 120 on how a toy should be listed for sale. For example, the sales instructions may indicate that the toy should be listed for sale at a price of five dollars, whereas another toy should be seven dollars. However, any other price may additionally or alternatively be used. In some examples, the sales instructions indicate when the toy should be offered for sale. For example, the toy may be released for sale on a particular date, or a sale (e.g., a reduced price) should be offered for a period of time (e.g., over a weekend). In some examples, the business rules that are received by the toy data receiver 125 instruct the toy server on how toys should be handled in association with the user's account. For example, when a physical toy is scanned, the business rules may indicate that the physical toy should only be allowed to be emulated by one mobile communication device. In some examples, the business rules may indicate that the physical toy may be emulated by more than one mobile communication device. For example, the business rules may indicate that a first user may transfer a toy to a friend such that the toy may be emulated by two mobile communication devices for a period of time (e.g., one day, two days, one week, etc.). The toy data receiver 125 adds the received model, the received tag data, the received tag encryption information, and the received sales instructions to the toy data database 160 so that, when the toy store interface is displayed by the toy manager 175 the current model data, tag data, tag encryption information, and/or sales instructions are properly used (block 1925). The tag provider 145 and/or the model provider 150, upon confirmation of a successful transaction by the transaction processor 130 provide the toy-identifying data and/or the model data stored in the toy data database 160 to the toy manager and/or the tag processor 192 (block 1930).

FIG. 20 is a flowchart representative of example machine-readable instructions which may be executed to implement the example tag processor 192 and/or to emulate a toy. The example program 2000 of FIG. 20 begins at block 2005 when the instruction handler 310 of the example tag processor 192 determines whether a requested instruction and an access key has been received from the top toy processor 270 (block 2005). If no instruction and access key has been received, the example instruction handler 310 waits until the instruction and access key are received (block 2005). The example access key verifier 320 retrieves the access key stored in the data store 194. The access key stored in the data store 194 is used to verify that the access key provided by the toy processor 270 is valid. The access key verifier 320 determines whether the provided access key matches the stored access key (block 2015). If the provided access key matches the stored access key (block 2015), the NFC controller 330 executes the received instruction (block 2025). In the illustrated example, the received instruction causes the NFC controller 330 to activate and/or deactivate a tag for emulation. In the illustrated example, the instruction may include a tag identifier (e.g., tag number one) that may be used to identify the tag data to be activated and/or deactivated. In such an example, the NFC controller 330 may retrieve the tag data associated with the tag identifier from the data store 194. In some examples, the instruction executed by the NFC controller 330 causes the NFC controller to enter a reading and/or scanning mode. When in the reading and/or scanning mode, the example NFC controller 330 reports tag data from tags within proximity of the NFC radio 187.

Returning to block 2015, if the provided access key does not match the stored access key, the instruction handler 310 notifies the example toy processor 270 of the incorrect access key (block 2020). The toy processor, as a result, may contact the access key controller 140 of the example toy server 120 to obtain a current access key to be used when interacting with the tag processor 192.

FIG. 21 is a flowchart representative of example machine-readable instructions which may be executed to implement the example 3D printer 197 of FIG. 4 to create a toy. The example program 2100 of the illustrated example of FIG. 21 begins at block 2105 when the toy printer 410 determines whether a request to print the toy has been received (block 2105). If no request has been received, the example toy printer 410 waits until the request is received (block 2105). In the illustrated example, the request to print the toy includes a model of the toy to be printed and toy-identifying data and/or tag data to be written to the toy. The example toy printer 410 prints the toy based on the received model data (block 2110). In the illustrated example, the 3D printer 197 uses an additive manufacturing process to create the toy. However, any other procedure for creating the toy may additionally or alternatively be used such as, for example, subtractive manufacturing. The example tag inserter 415 embeds a tag (e.g., an NFC tag) in the printed toy (block 2112). In the illustrated example, the tag is embedded during the printing process, such that material used to print the toy surrounds the tag. However, in some examples, the tag is placed on an exterior of the printed toy. The example tag configurer 420 configures a tag embedded in the printed model using the received toy-identifying data and/or tag data (block 2115). In the illustrated example, the toy-identifying data and/or tag data is received in an encrypted format. Prior to writing the toy-identifying data and/or tag data to the tag, the tag configurer 420 decrypts the toy-identifying data and/or tag data using the tag encryption information provided to the toy store 120 by the toy manufacturer 105. Once the toy has been printed and the tag has been configured, the toy shipper 430 ships the printed toy to the customer (block 2120).

Figure 22:
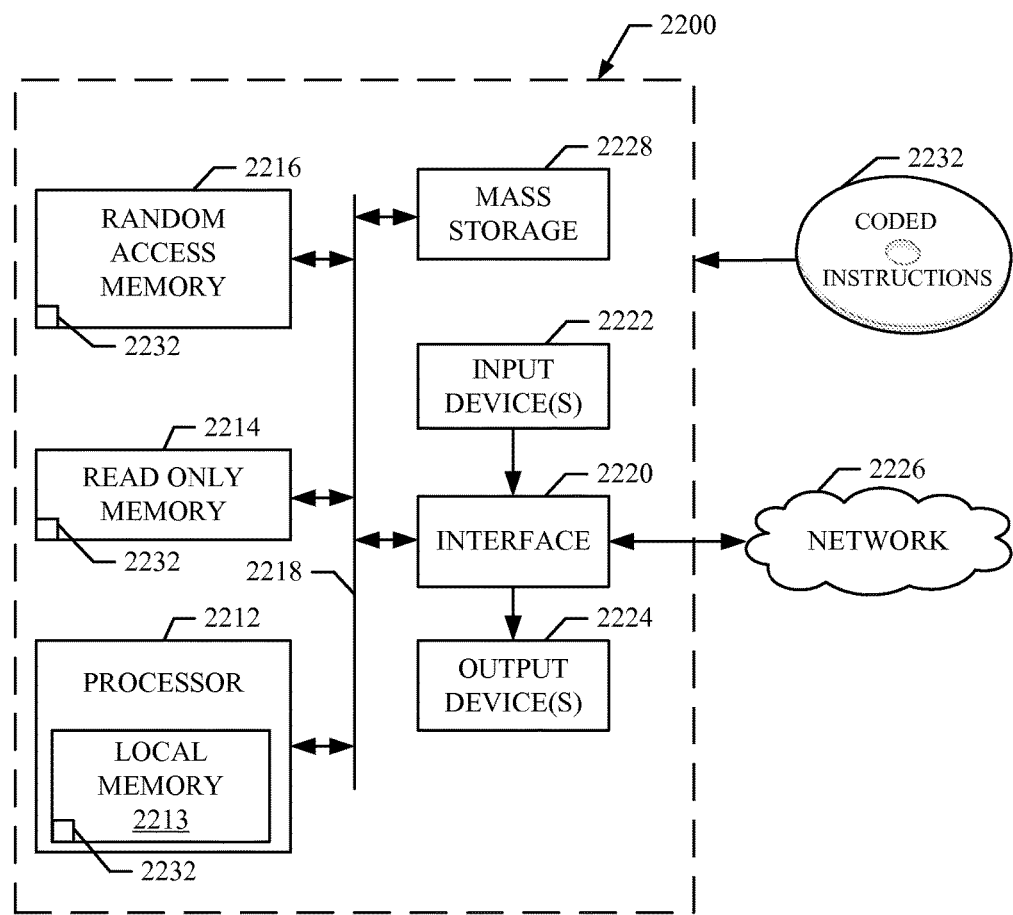
FIG. 22 is a block diagram of an example processor platform capable of executing the example machine readable instructions of FIGS. 9, 10, 11, 12, 13, 14, 15, 16, 17, 18, 19, 20, and/or 21 to implement the example toy manager of FIGS. 1 and/or 2, the example toy server of FIG. 1, the example tag processor of FIGS. 1 and/or 3, and/or the example 3D printer of FIGS. 1 and/or 4.

FIG. 22 is a block diagram of an example processor platform 2200 capable of executing the instructions of FIGS. 9, 10, 11, 12, 13, 14, 15, 16, 17, 18, 19, 20, and/or 21 to implement the example toy server 120 of FIG. 1, the example toy manager 175 of FIGS. 1 and/or 2, the example tag processor 192 of FIGS. 1 and/or 3, and/or the example 3D printer 197 of FIGS. 1 and/or 4. The processor platform 2100 can be, for example, a server, a personal computer, a mobile communication device (e.g., a cell phone, a smart phone, a tablet such as an iPad™), a personal digital assistant (PDA), an Internet appliance, a gaming console, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors, or controllers from any desired family or manufacturer.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), and/or a PCI express interface.

In the illustrated example, one or more input devices 2222 are connected to the interface circuit 2220. The input device(s) 2222 permit(s) a user to enter data and commands into the processor 2212. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 2224 are also connected to the interface circuit 2220 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2220 of the illustrated example, thus, typically includes a graphics driver card, a graphics driver chip or a graphics driver processor.

The interface circuit 2220 of the illustrated example also includes a communication device such as a transmitter, a receiver, a transceiver, a modem and/or network interface card to facilitate exchange of data with external machines (e.g., computing devices of any kind) via a network 2226 (e.g., an Ethernet connection, a digital subscriber line (DSL), a telephone line, coaxial cable, a cellular telephone system, etc.).

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, RAID systems, and digital versatile disk (DVD) drives.

The coded instructions 2232 of FIGS. 9, 10, 11, 12, 13, 14, 15, 16, 17, 18, 19, 20, and/or 21 may be stored in the mass storage device 2228, in the volatile memory 2214, in the non-volatile memory 2216, and/or on a removable tangible computer readable storage medium such as a CD or DVD.

From the foregoing, it will appreciate that methods, apparatus, and articles of manufacture have been disclosed to enable a toy to be emulated by a mobile communication device.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A method of emulating a toy that sends toy-identifying data to a game console through a wireless interface, the method comprising:
   identifying the toy to be emulated by a mobile communication device;
   transmitting a request to obtain toy-identifying data associated with the toy to a remote storage;
   receiving the toy-identifying data from the remote storage at the mobile communication device;
   determining an access key to be used when accessing a secure element of the mobile communication device, the access key set in the secure element by the remote storage;
   storing the toy-identifying data in the secure element of the mobile communication device by interacting with a toy processor installed in the secure element by the remote storage, the toy processor to allow interaction when the access key is provided; and
   transmitting, from a wireless radio of the mobile communication device, the toy-identifying data to a reader of the gaming console, the mobile communication device separate from the game console, the mobile communication device separate from the reader.

2. The method as described in claim 1, wherein the gaming console is a video game console.

3. The method as described in claim 1, wherein the wireless interface is a Near Field Communication (NFC) interface.

4. The method as described in claim 1, wherein the mobile communication device is a cellular phone.

5. The method as described in claim 1, further including, if the access key to access the secure element is not known, transmitting an access key request to a toy server.

6. The method as described in claim 1, wherein the remote storage includes a toy server, and the request causes the toy server to transmit the toy-identifying data to the secure element.

7. The method as described in claim 6, wherein the mobile communication device is to obtain the toy-identifying data via a tag proxy of the mobile communication device.

8. The method as described in claim 6, wherein the mobile communication device is to obtain the toy-identifying data via an over-the-air protocol.

9. The method as described in claim 1, wherein the request is a request to purchase the toy, and the identifying of the toy includes receiving a selection of the toy to be purchased.

10. The method as described in claim 1, wherein the toy is a first toy and further including reading, via the wireless radio, a tag embedded in a second toy.

11. The method as described in claim 10, wherein the second toy is a physical toy.

12. The method as described in claim 10, wherein the remote storage includes a toy server, and further including transmitting a confirmation code associated with the second toy to the toy server, the mobile communication device to obtain the toy-identifying data only when the confirmation code is valid.

13. A mobile communication device comprising:
a processor;
a secure storage;
a wireless radio; and
a memory including machine readable instructions that, when executed by the processor, cause the processor to perform operations including:
transmitting a request to obtain toy-identifying data associated with a toy to be emulated to a remote storage;
determining an access key to be used when accessing the secure storage of the mobile communication device, the access key set in the secure storage by the remote storage;
storing toy-identifying data received from the remote storage in the secure storage by interacting with a toy processer installed in the secure storage by the remote storage, the toy processor to allow interaction when the access key is provided; and
transmitting, from the wireless radio, the toy-identifying data stored in the secure storage, to a gaming console via a reader, the gaming console and the reader separate from the mobile communication device.

14. The mobile communication device as described in claim 13, wherein the instructions, when executed by the processor, cause the processor to, if the access key to access the secure storage is not known, transmit an access key request to a toy server.

15. The mobile communication device as described in claim 13, wherein the remote storage includes a toy server, and the request is to cause the toy server to transmit the toy-identifying data to the secure storage.

16. The mobile communication device as described in claim 13, wherein the request is a request to purchase the toy, and the machine readable instructions, when executed by the processor, cause the processor to identify the toy based on a selection of the toy to be purchased.

17. The mobile communication device as described in claim 13, wherein the toy is a first toy and the instructions, when executed by the processor, cause the processor to read, via the wireless radio, a tag embedded in a second toy.

18. A tangible machine readable storage medium including instructions which, when executed, cause a processor of a mobile communication device to perform operations comprising:
transmitting a request to a remote storage, the request to obtain toy-identifying data associated with a toy to be emulated by the mobile communication device;
determining an access key to be used when accessing a secure element of the mobile communication device, the access key set in the secure element by the remote storage;
storing the toy-identifying data received from the remote storage in the secure element of the mobile communication device by interacting with a toy processor installed in the secure element by the remote storage, the toy processor to allow interaction when the access key is provided; and
causing a wireless radio of the mobile communication device to transmit the toy-identifying data to a gaming console via a reader, the gaming console and the reader separate from the mobile communication device.

19. The tangible machine readable storage medium as described in claim 18, wherein the toy is a first toy and the machine readable instructions, when executed, cause the processor to identify the first toy to be emulated by activating the wireless radio to read a tag embedded in a second toy.

20. The tangible machine readable storage medium as described in claim 18, wherein the remote storage includes a toy server, and the machine readable instructions, when executed by the processor, cause the processor to transmit a confirmation code associated with a second toy to the toy server, the processor to obtain the toy-identifying data only when the confirmation code is valid.

* * * * *